(12) United States Patent
Sakamoto et al.

(10) Patent No.: US 10,719,190 B2
(45) Date of Patent: Jul. 21, 2020

(54) CONTROLLING CONTENT TRANSPARENCY AND STROKE BACKGROUND TRANSMITTANCE

(71) Applicant: Sharp Kabushiki Kaisha, Sakai, Osaka (JP)

(72) Inventors: Kiho Sakamoto, Sakai (JP); Satoshi Terada, Sakai (JP); Hiroki Munetomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/980,796

(22) Filed: May 16, 2018

(65) Prior Publication Data

US 2018/0335895 A1    Nov. 22, 2018

(30) Foreign Application Priority Data

May 22, 2017  (JP) .................................. 2017-101197

(51) Int. Cl.
| | |
|---|---|
| *G06F 3/0481* | (2013.01) |
| *G06F 3/044* | (2006.01) |
| *G06T 11/20* | (2006.01) |
| *G06F 3/0488* | (2013.01) |
| *G06F 3/0484* | (2013.01) |

(52) U.S. Cl.
CPC ............ *G06F 3/0481* (2013.01); *G06F 3/044* (2013.01); *G06T 11/203* (2013.01); *G06F 3/04847* (2013.01); *G06F 3/04883* (2013.01); *G06F 2203/04804* (2013.01)

(58) Field of Classification Search
CPC .................. G06F 3/0481; G06F 3/044; G06F 2203/04804; G06F 3/04847; G06F 3/04883; G06F 3/048; G06T 11/203
See application file for complete search history.

(56) References Cited

U.S. PATENT DOCUMENTS

| | | | | |
|---|---|---|---|---|
| 2004/0041820 A1* | 3/2004 | Sevigny | .................... | G06T 1/00 345/619 |
| 2008/0109751 A1* | 5/2008 | Fitzmaurice | .......... | G06F 3/0488 715/793 |
| 2011/0154192 A1* | 6/2011 | Yang | ................... | G06F 17/2288 715/256 |
| 2014/0015782 A1* | 1/2014 | Kim | .................... | G06F 3/04883 345/173 |
| 2014/0133731 A1* | 5/2014 | Baumgart | .............. | A61B 6/481 382/132 |
| 2014/0372938 A1* | 12/2014 | Park | ...................... | G06F 3/0488 715/793 |

(Continued)

FOREIGN PATENT DOCUMENTS

JP            2013-114431 A       6/2013

*Primary Examiner* — Jeanette J Parker
(74) *Attorney, Agent, or Firm* — Keating & Bennett, LLP

(57) ABSTRACT

A display apparatus includes an object display unit that displays in a display region an object including a content, and a stroke drawn on the content in an overlaid fashion, and a visibility balance setting unit that sets a visibility balance of the displayed content. The visibility balance setting unit includes a content transparency setting unit that sets content transparency serving as transparency of the content, and a stroke background transmittance setting unit that sets stroke background transmittance that is transmittance of a background of the drawn stroke.

5 Claims, 21 Drawing Sheets

(56) References Cited

U.S. PATENT DOCUMENTS

2015/0346976 A1\* 12/2015 Karunamuni ....... G06F 3/04817
                                                                   715/765
2017/0176748 A1\* 6/2017 Kim ...................... G01C 21/16

\* cited by examiner

| CONTENT | CONTENT A.jpg |
|---|---|
| POSITION | (100, 100)–(500, 400) |
| STROKE | STROKE DATA A<br>STROKE DATA B<br>⋮ |
| TRANSMITTANCE | 0% |

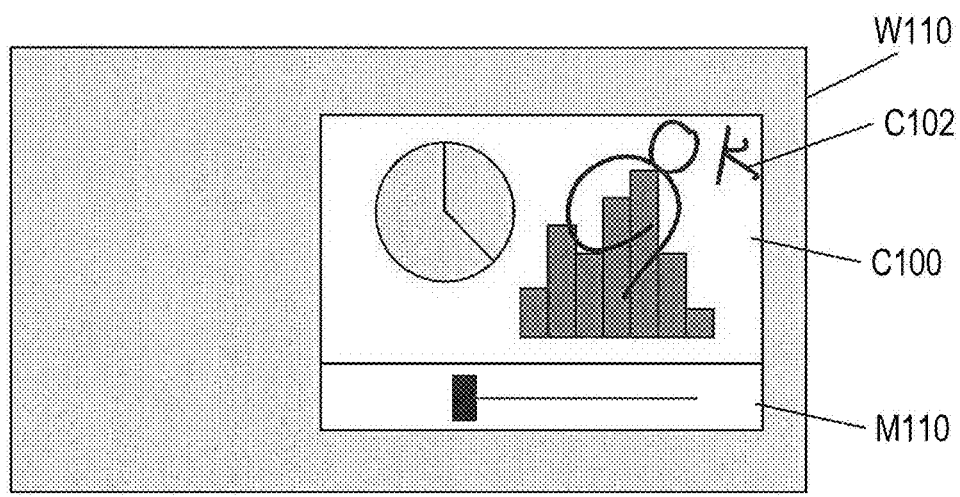
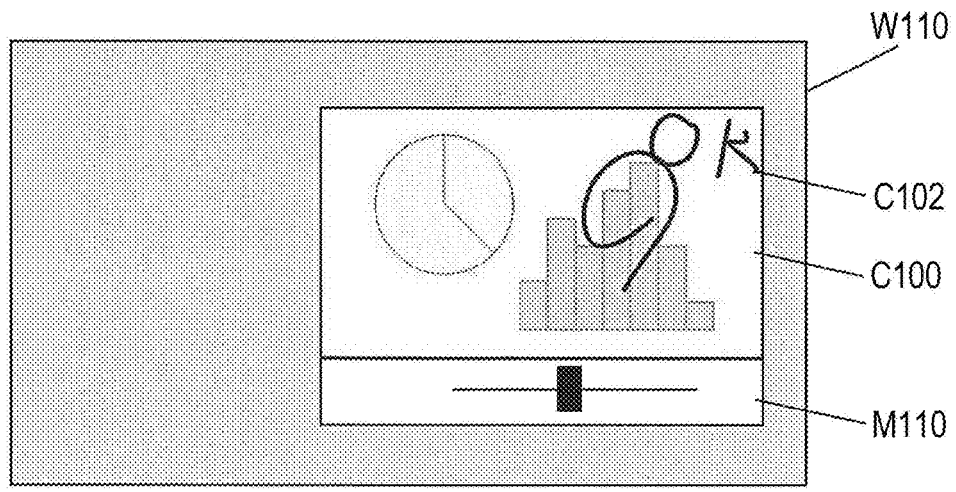
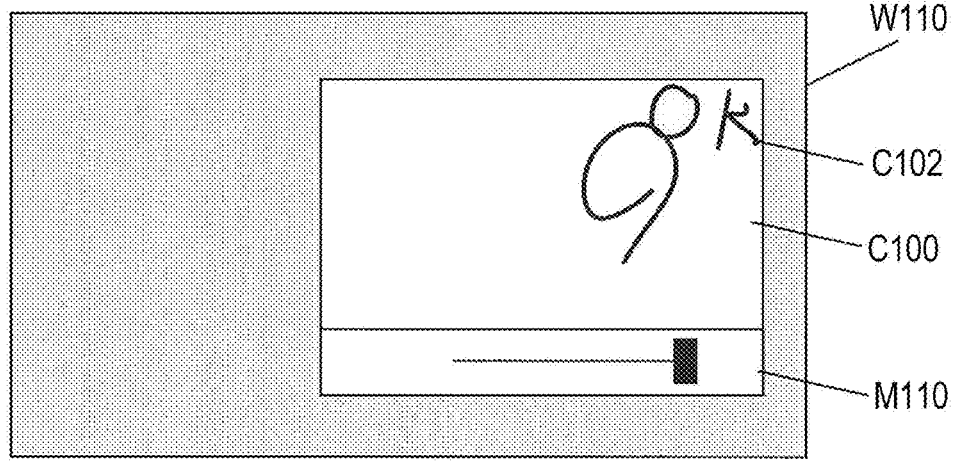

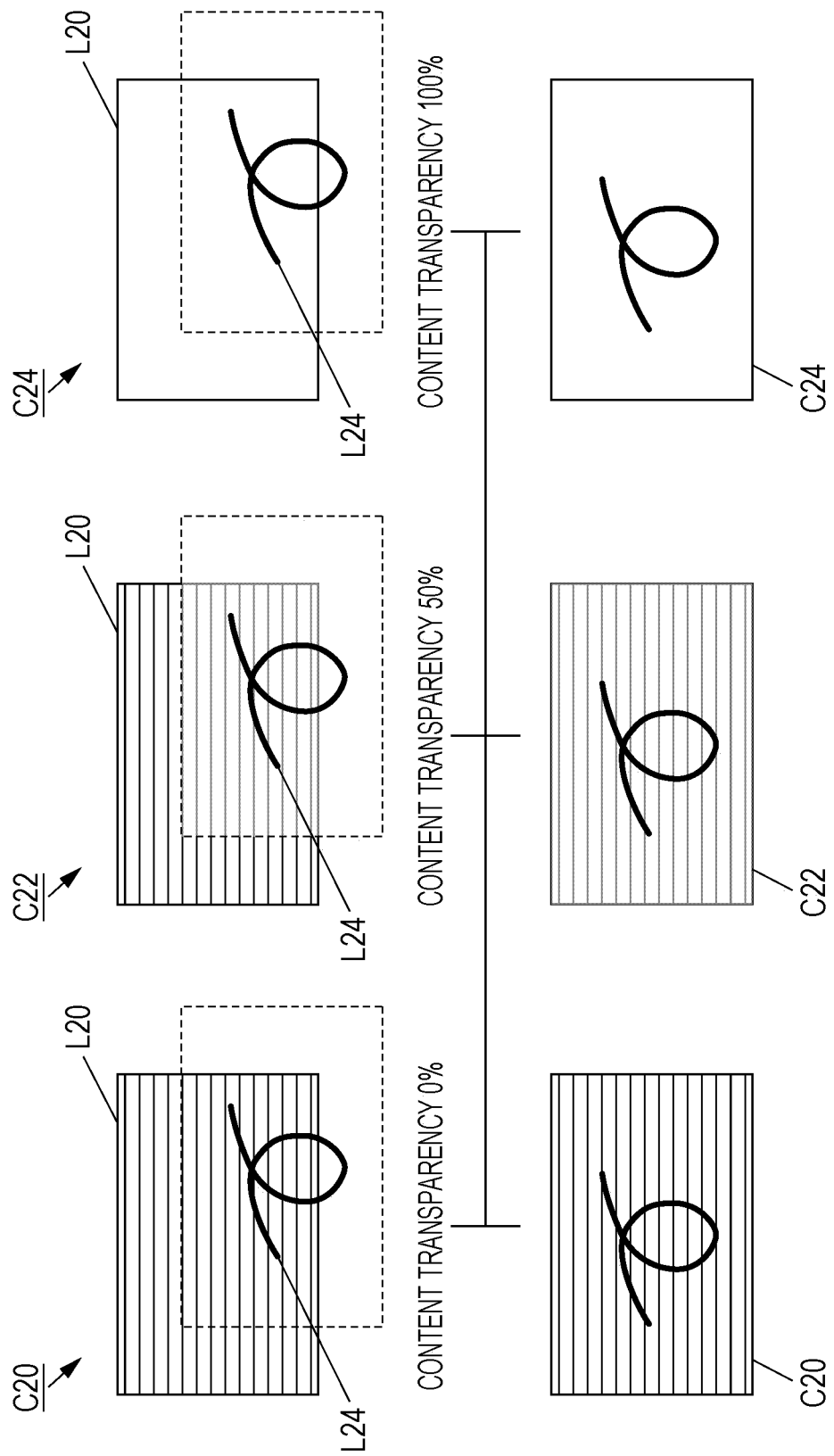

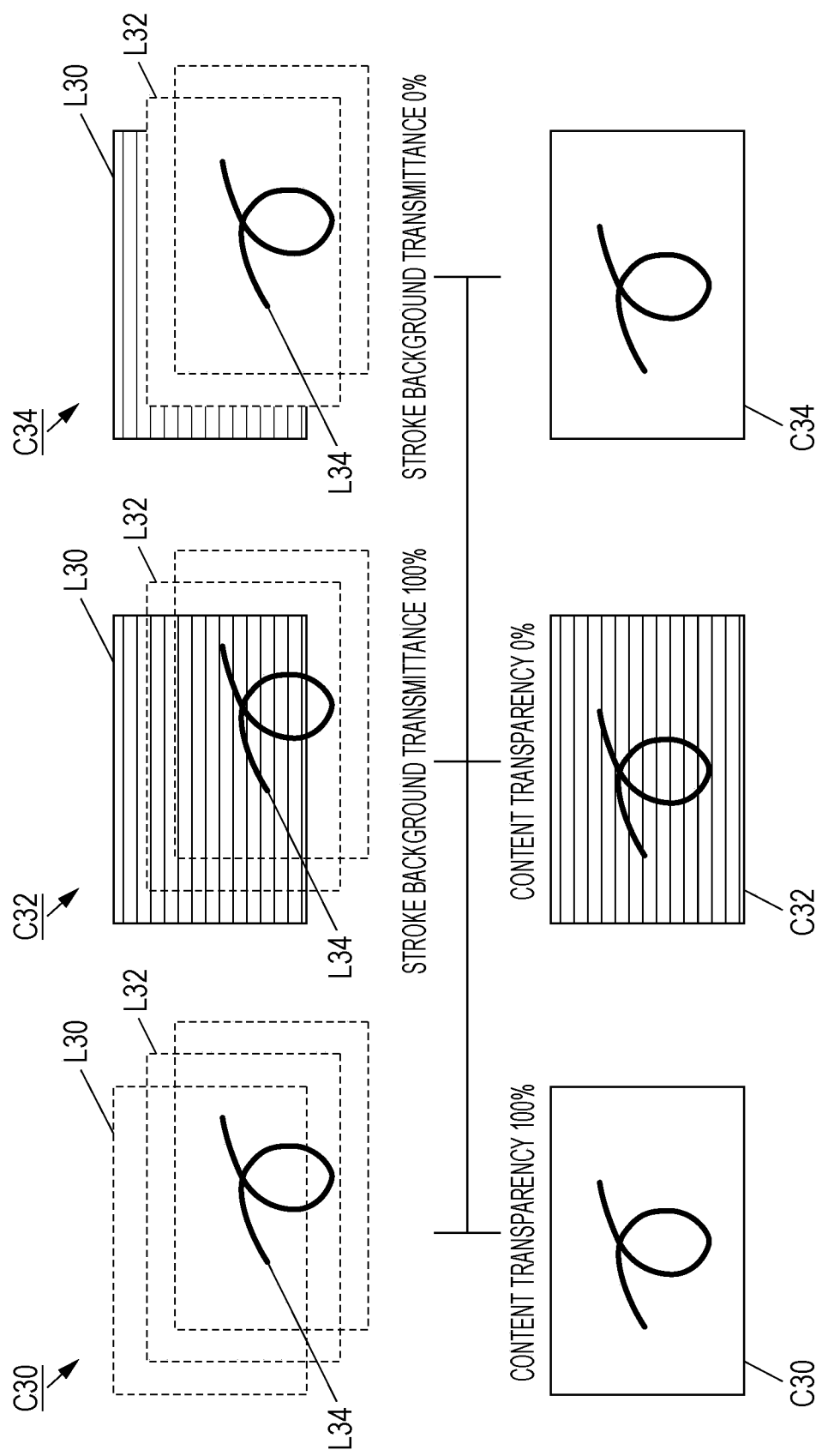

| CONTENT | CONTENT A.jpg (ID: 001) |
|---|---|
| POSITION | (100, 100)–(500, 400) |
| STROKE | STROKE DATA A (ID: 001) |
| | STROKE DATA B (ID: 002) |
| TRANSMITTANCE | 0% |

CONTROLLING CONTENT TRANSPARENCY AND STROKE BACKGROUND TRANSMITTANCE

BACKGROUND

1. Field

The present disclosure relates to a display apparatus, a display method, and a non-transitory computer-readable recording medium.

2. Description of the Related Art

Some of display apparatuses of related art display multiple contents, such as text files or image files, on a sheet. Some of the display apparatuses of related art allow a person to hand-write a stroke on a content using an electronic pen and display the stroke as an object (sheet). Such a display apparatus may be typically used as an interactive whiteboard (IWB).

If an object includes a content serving (text data) as a background and a stroke (hand-writing) displayed in mixture, users may have difficulty in differentiating one from the other and thus difficulty in clearly viewing the content and the stroke.

Japanese Unexamined Patent Application Publication No. 2013-114431 discloses a technique that modifies a background portion overlaid on an existing object to a predetermined background (a translucent background) that allows handwriting to be more easily visible when the handwriting is input.

The operation disclosed in Japanese Unexamined Patent Application Publication No. 2013-114431 is limited to a handwriting time period. A screen is subject to flickering at switching between a translucent state and a standard state, and becomes difficult to view.

During the standard state with no handwriting input, a content is not translucent, and a handwritten stroke and the content co-exist in mixture. Further, the handwritten portion only is set to be translucent. Any particular action is not accepted even if a user desires to cause the handwriting to be pronounced.

In a usage environment where a display apparatus may be used as an electronic whiteboard, a user may desire to handwrite the way to a destination, may set a portion of interest or a corrected portion to be pronounced in a graph or drawings, or may desire to highlight a handwritten portion only. In related art techniques, such a particular operation is difficult. If a displayed content and a handwritten stroke are close in color, visibility thereof is reduced.

SUMMARY

It is desirable to provide a user-friendly display apparatus that allows transparency or transmittance to be set in an easy way in response to an object.

According to one aspect of the disclosure, there is provided a display apparatus. The display apparatus includes an object display unit that displays in a display region an object including a content, and a stroke drawn on the content in an overlaid fashion, and a visibility balance setting unit that sets a visibility balance of the displayed content. The visibility balance setting unit includes a content transparency setting unit that sets content transparency serving as transparency of the content, and a stroke background transmittance setting unit that sets stroke background transmittance that is transmittance of a background of the drawn stroke.

According to another aspect of the disclosure, there is provided a display method. The display method includes displaying in a display region an object including a content, and a stroke drawn on the content in an overlaid fashion and setting a visibility balance of the displayed content. The setting includes setting content transparency serving as transparency of the content, and setting stroke background transmittance that is transmittance of a background of the drawn stroke.

According to another aspect of the disclosure, there is provided a non-transitory computer-readable recording medium. The non-transitory computer-readable recording medium stores a program causing a computer to execute a process. The process includes displaying in a display region an object including a content, and a stroke drawn on the content in an overlaid fashion, and setting a visibility balance of the displayed content. The setting includes setting content transparency serving as transparency of the content, and setting stroke background transmittance that is transmittance of a background of the drawn stroke.

BRIEF DESCRIPTION OF THE DRAWINGS

FIG. 8A through FIG. 8C illustrate operation examples of the first embodiment;

FIG. 9 diagrammatically illustrates a process of a second embodiment;

FIG. 16 illustrates operation examples of the sixth embodiment;

DESCRIPTION OF THE EMBODIMENTS

Embodiments of the disclosure are described with reference to the drawings. For convenience of explanation, the embodiments described below are related to a display apparatus with a touch panel integrated thereinto. The disclosure is applicable to any type of display apparatus that allows an object to be drawn or located thereon in response to a user's operational input.

1. First Embodiment 1.1 Whole Configuration

Figure 1:
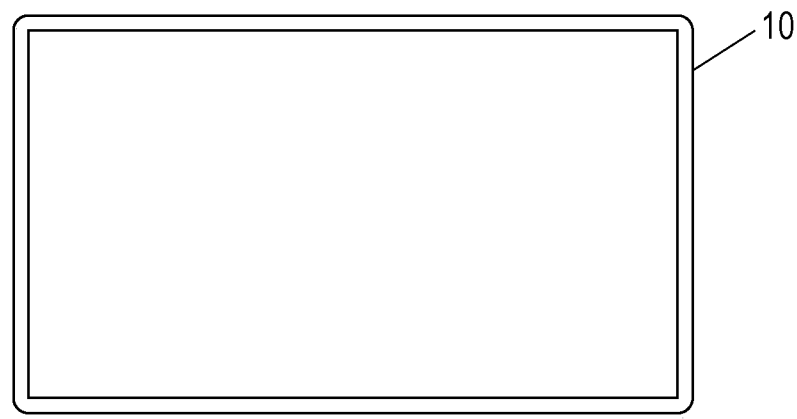
FIG. 1 is an external view of a display apparatus.

FIG. 1 is an external view of a display apparatus 10 of a first embodiment of the disclosure. The display apparatus 10 may be a liquid-crystal display, for example, and include a touch panel that receives a touch input.

The touch panel receives an operational input performed by a user, such as a touch, flick, or slide action. A detection mechanism to detect a touch may be a capacitance touch panel, or a pressure sensitive touch panel. Any device is acceptable as long as the device receives a user's operational input, such as a touch.

A touching tool may be a user's finger or a pen. In the case of a pen, the pen's user may be identified using unique identification information identifying the pen (such as a serial number or a media access control (MAC) address).

A variety of apparatuses may be possible as the display apparatus 10. The display apparatus 10 may be a large-scale stationary display apparatus, such as an electronic whiteboard. The display apparatus 10 may be a compact and portable display apparatus, such as a tablet terminal. The display apparatus 10 may be a smart phone. The display apparatus 10 may also be a variety of display apparatuses and information processing apparatuses, including a computer, a car navigation system, and an electronic dictionary.

1.2 Functional Configuration

Figure 2:
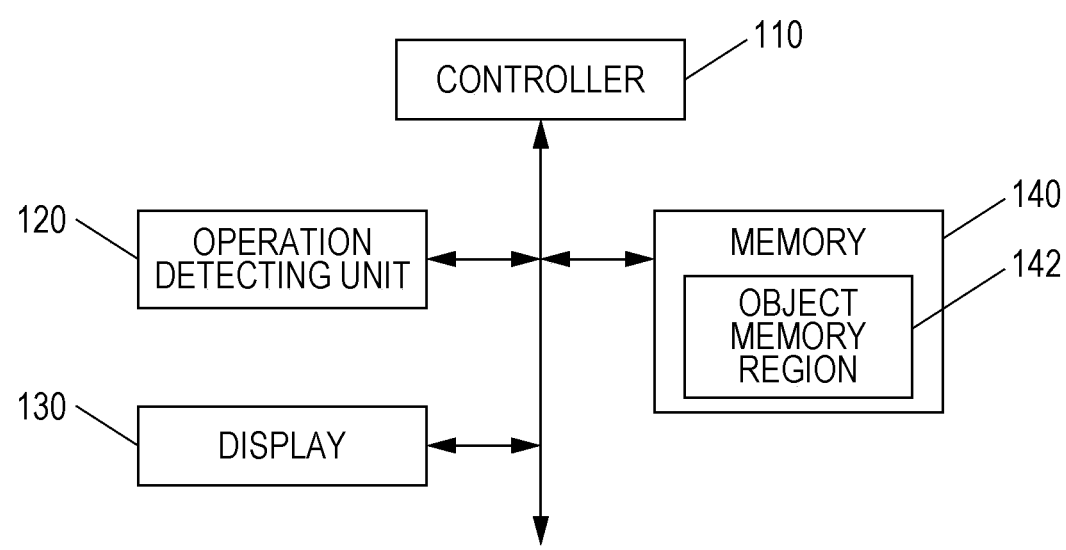
FIG. 2 illustrates a functional configuration of a first embodiment.

The functional configuration of the display apparatus 10 of the first embodiment is described below with reference to FIG. 2. Referring to FIG. 2, the display apparatus 10 includes a controller 110, an operation detecting unit 120, a display 130, and a memory 140.

The controller 110 generally controls the whole display apparatus 10. The controller 110 implements functionalities of the display apparatus 10 by reading and executing a variety of programs stored on the memory 140. The controller 110 includes a central processing unit (CPU), for example.

If the display apparatus 10 includes a touch panel, the controller 110 controls the displaying of an object, such as an image rendered or input via a display screen (a operation detecting unit 120) and the displaying of an image input from another image input device.

The operation detecting unit 120 detects a user's operation. For example, the operation detecting unit 120 includes a touch panel or the like, which is integrated with the display 130 as a unitary body. The operation detection method may be any of a capacitance method, a pressure sensitive method using a resistive membrane mechanism, an infrared method, and an electromagnetic method.

The display 130 displays a variety of information to the user, or displays a work area where an object is rendered or located. For example, the display 130 may include a liquid-crystal display (LCD) or an organic electroluminescent (EL) display.

The memory 140 stores a variety of programs used to operate the display apparatus 10 and a variety of data. For example, the memory 140 includes a semiconductor memory, such as a solid state drive (SDD), or a magnetic disk, such as a hard disk drive (HDD).

The memory 140 includes an object memory region 142 and stores an object that is displayed or rendered.

Figures 3, 4:
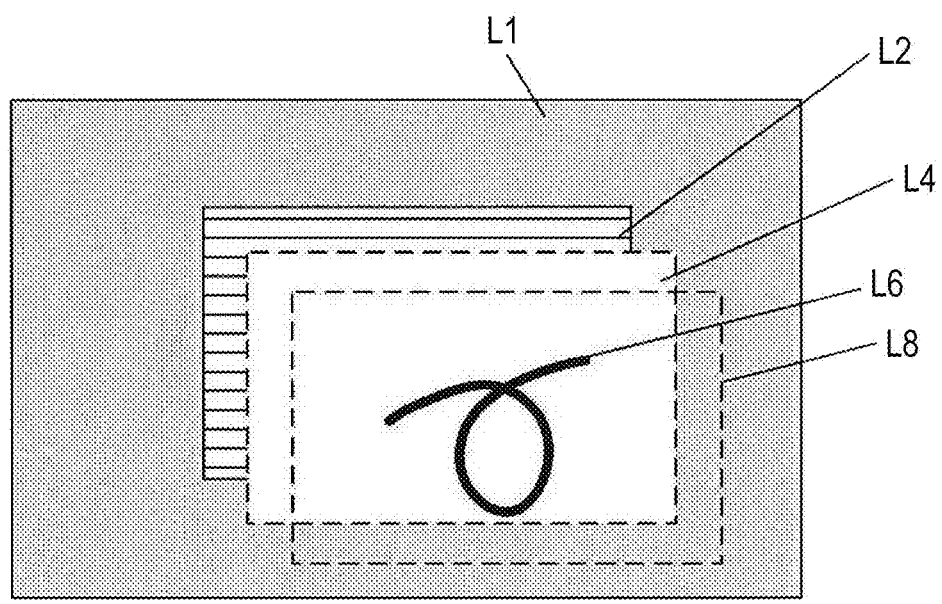
FIG. 3 illustrates an example of a data structure of an object of the first embodiment.
FIG. 4 illustrates a basic concept of the first embodiment.

An example of the configuration of an object stored on the object memory region 142 is described with reference to FIG. 3 and FIG. 4. FIG. 3 illustrates an example of a structure of data stored on the object memory region 142, and FIG. 4 illustrates a state in which an object (sheet) is displayed on the display 130.

Referring to FIG. 4, the display region of the display 130 includes a work area L1 where an object is located. One or more contents L2 are located on the work area L1.

One or more objects are displayed on the work area L1. The user may perform a variety of operations on the object displayed on the work area L1, including moving, expanding, reducing, copying, and/or deleting the object.

The contents include a still image file (a joint photographic experts group (JPEG) file, a graphics interchange format (GIF) file, or a portable network graphics (PNG) file), a document file (such as a text file, a document file, such as a word processing spreadsheet file, or a presentation software file, or a portable document file (PDF) file), and a moving image file (such as of an avi format file or an MPG format file). Any file is acceptable as long as the file is located or displayed on the work area L1. An audio file with the contents thereof unable to be displayed may be displayed using an icon.

The content L2 may be displayed in a content layer. A stroke may be drawn on the content L2.

As a stroke L6 is handwritten (using a finger of a user, a pen, or a mouse), and the stored stroke L6 is drawn. The stroke is displayed on the content. The stroke may be drawn on a pre-located stroke background L4, or the stroke background L4 may be inserted after the stroke is input.

The stroke background L4 is an image that is inserted when the stroke is drawn. In accordance with the first embodiment, the appearance of the content L2 changes by changing transmittance of the stroke background (hereinafter referred to as stroke background transmittance).

If the stroke background is opaque (a stroke background transmittance of 0%), a stroke L6 only is visible, and the content L2 is invisible to the user. If the stroke background becomes transparent (a stroke background of 100%), the content L2 is visible to the user, and the stroke L6 is overlay-displayed on the content L2.

If the stroke background transmittance is somewhere between 0% and 100%, for example, 30%, the stroke background is a translucent image. As a result, how the content looks changes, and the stroke L6 is clearly displayed.

More specifically, the stroke background layer (background layer L4) is located on the content (content layer) L2 located on the work area (default layer) L1. The stroke L6 is input and drawn on the stroke background L4 (a layer on which the stroke L6 is input and drawn is virtually referred to as a stroke layer L8).

With the stroke background transmittance of the stroke background L4 changed in this state, the user may view the content L2 at a changing brightness level, and may thus switch between the content L2 in a visible state and the content L2 in an invisible state.

The object includes a content and a stroke. Alternatively, the object may include only a content or only a stroke. The stroke background L4 is typically identical in size to the content L2, but may be different in size from the content L2 depending on the size of the stroke.

Referring to FIG. 3, the object memory region 142 stores a content (such as "content A.jpg") located and displayed, coordinates indicating a position on a work area (such as "(100, 100)-(500, 400)", data of the stroke drawn and displayed on the content (such as "stroke data A"), and transmittance of the stroke background (such as "0%").

1.3 Procedure of Process

Figure 5:
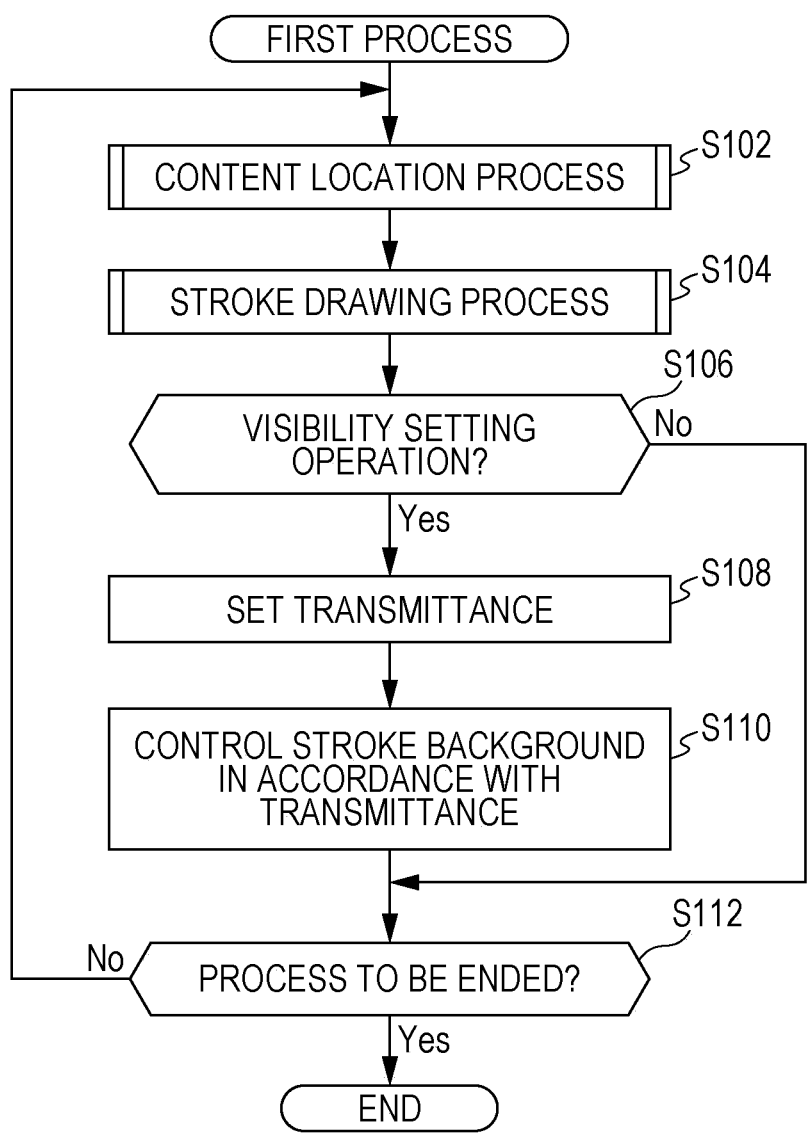
FIG. 5 illustrates a process of the first embodiment.

The procedure of the process of the first embodiment is described with reference to FIG. 5. FIG. 5 illustrates a first process of the first embodiment.

The controller 110 performs a content location process to locate a content on the work area (step S102). Via the content location process, the content is located and thus displayed on the work area. For convenience of explanation, a single content is located (displayed) herein, but multiple contents may also be located (displayed).

Contents to be located (displayed) may include a content read from a storage device, or image data (of a still image and/or a moving image) photographed by an imaging device (not illustrated). The contents to be located (displayed) may also include text characters input by an input device (not illustrated) or a content received from another device or a server via communications.

Displaying the content is intended to mean not only reading and displaying a still image (raster data) but also drawing in the case of vector data. Depending on a document file, a thumbnail thereof may be generated and displayed, or an icon may be displayed for identification.

The drawing process of the stroke is then performed (step S104). The stroke drawing is intended to mean not only handwriting the stroke on the content but also reading and drawing the pre-stored stroke data. For example, the user may trace on the content with a pen, and the stroke based on the trajectory of the trace is stored. Lines or points may be drawn based on the stored stroke (the stroke based on the trajectory).

If an operation to set visibility (the stroke background transmittance setting operation) has been performed (yes branch from step S106), the controller 110 performs the transmittance setting operation (step S108). In this way, the stroke background transmittance setting operation is performed in the first embodiment.

In the stroke background transmittance setting operation, a visibility setting region (a transmittance setting region) is displayed on a per object basis, and the stroke background is set using a setting unit displayed in the transmittance setting region. The setting unit may be a variety of user interfaces (UIs), including inputting a numerical value, using a select button, or using a slide bar.

The controller 110 performs a control operation on the stroke background in accordance with the set stroke background transmittance (step S110). If an instruction to end the process is input (yes branch from step S112), the controller 110 ends the process; otherwise, processing returns to step S102 to repeat the process.

The transmittance of the stroke background is controlled such that the set stroke background transmittance is achieved. If the set stroke background transmittance is 0%, a clouded stroke background is overlay-displayed on the content (displayed on the content in an overlaid fashion). In this way, the content displayed beneath the stroke is not visible to the user.

If the set stroke background transmittance is 100%, the stroke background becomes transparent, and the content is visible. In other words, the user may view both the content and the stroke.

The stroke background transmittance may be set to be somewhere between 0% and 100%. The relationship between the set transmittance and the actual transmittance of the stroke background may be calculated using a formula, or may be determined in accordance with a conversion table.

The transmittance of the stroke background is directly set as described above in accordance with the first embodiment. An index indicating the content visibility may be used such that the transmittance is easily recognizable to the user. In such a case, a visibility of 0% indicates that the user may view both the stroke and the content (in other words, a stroke background transmittance of 100%), and a visibility of 100% indicates that the user may view only the stroke with the content not displayed (in other words, a stroke background transmittance of 0%).

1.4 Operation Examples

Figure 6:
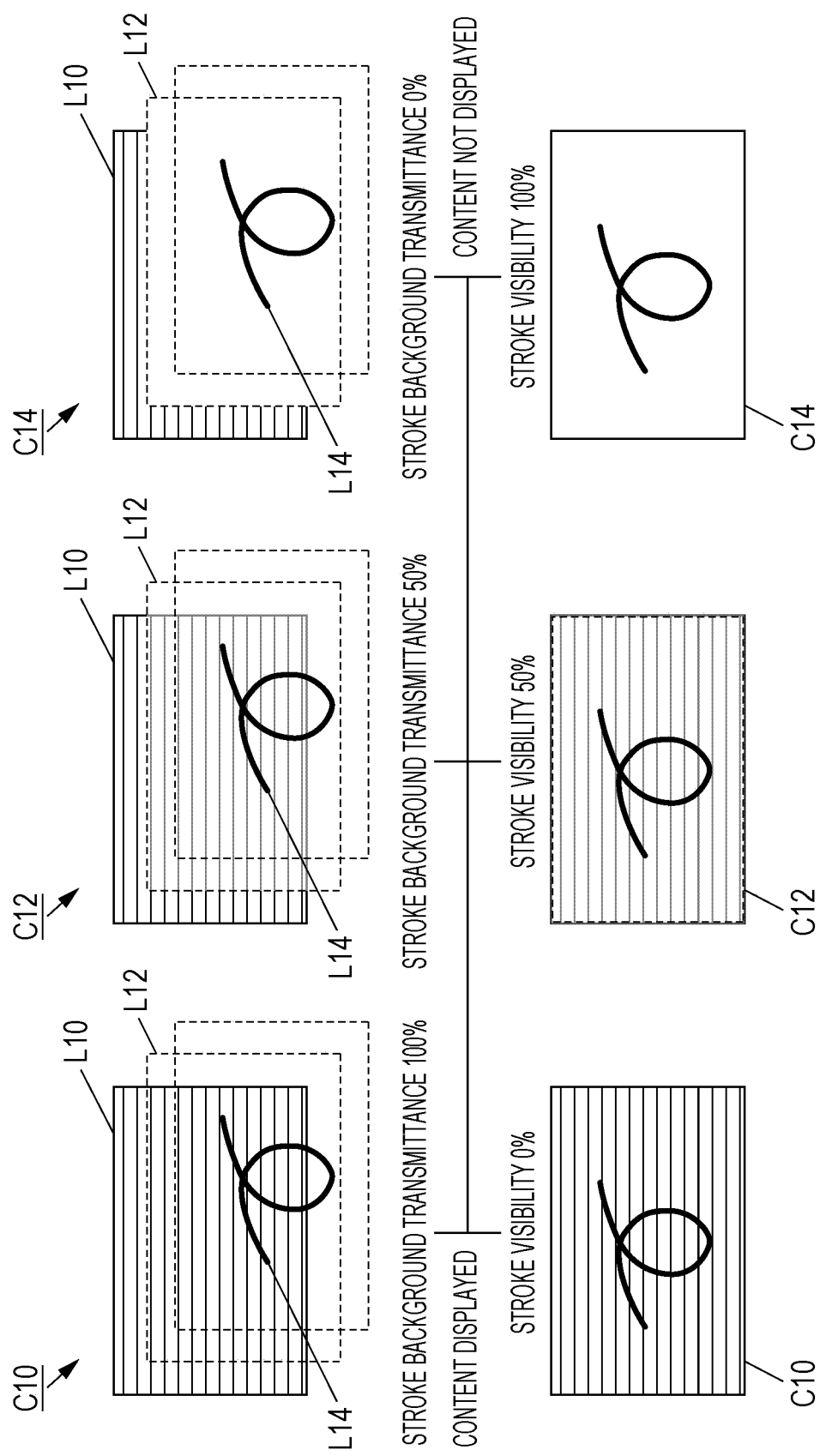
FIG. 6 diagrammatically illustrates the process of the first embodiment.

Operation examples of the first embodiment are described below with reference to FIG. 6. FIG. 6 diagrammatically illustrates the state of each layer.

Referring to FIG. 6, the left end portion indicates the state in which the content is displayed, and the right end portion indicates that the content is not displayed. The top side portion diagrammatically indicates the object is decomposed into layers and the bottom side portion indicates the state of the object that is actually displayed.

A state C10 indicates that the content is displayed. In the state C10, the stroke background transmittance is 100%, and a content L10 is visible. In other words, a stroke L14 is overlay-displayed on the content L10.

A state C12 indicates that the content is displayed in the middle state. In the state C12, the stroke background transmittance of a stroke background L12 is raised to 50%. The content is not necessarily fully invisible but is displayed in a translucent state.

A state C14 indicates that the content is not displayed. In the state C14, the stroke background transmittance of the stroke background L12 is 0% and is thus clouded, and the content becomes invisible. In the state C14, the user is able to view only the stroke L14.

When the stroke background transmittance is 0%, the content is simply invisible, and the stroke background transmittance may not necessarily be clouded (in white). For example, the color of the stroke background L12 may be blue, black, or any other color, or may be of the same color as the work area.

The stroke background transmittance may not necessarily be within a range of from 0% to 100%. A maximum value and a minimum value of the stroke background transmittance may be set. For example, setting the maximum value to be 80% precludes the content from being fully invisible.

In accordance with the first embodiment, the setting of transmittance switches the content from one visibility value to another. For the content visibility switching, the content is switched from one state to another. This is achieved by changing the stroke background transmittance.

The "content displayed state" and the "content non-displayed state" have been described. Alternatively, numerical values may be set in view of the visibility of the stroke (stroke visibility). For example, the state C10 indicates that the content is fully displayed, and the content and the stroke are difficult to differentiate from each other. The stroke visibility is thus 0%. The state C14 indicates that the content is not displayed, and the stroke is fully visible. The stroke visibility is thus 100%. In this way, the user may set the stroke visibility. In such a case, a slider may be used to change the stroke visibility. As illustrated in FIG. 8A through FIG. 8C, the stroke visibility (namely, the stroke background transmittance) may be varied and set on a real-time basis by moving a slider.

The slider in the context of the specification is intended to mean a slider as a control present in a straight line (a track bar or a slider bar), and is operated by moving the slider. An interface similar to the slider, such as a scroll bar, may also be used as the slider.

Figure 7A:
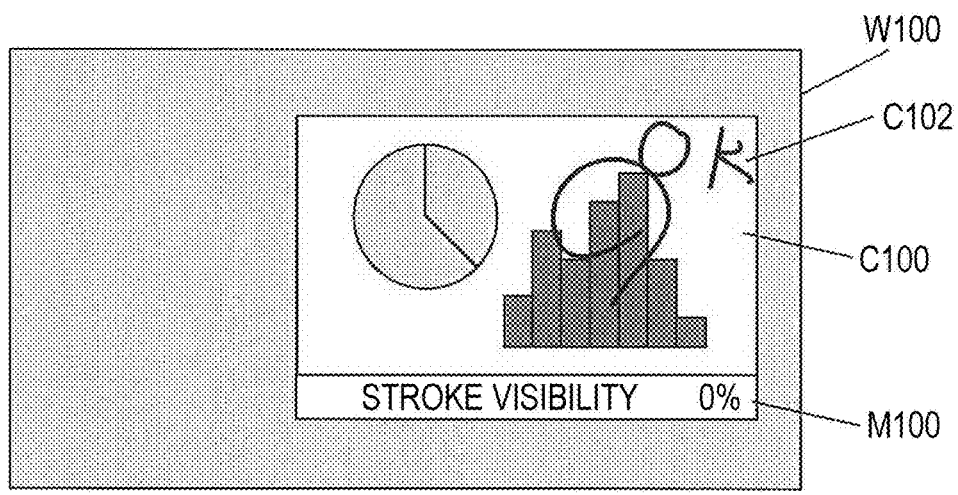
FIG. 7A through FIG. 7C illustrate operation examples of the first embodiment.
Figure 7B:
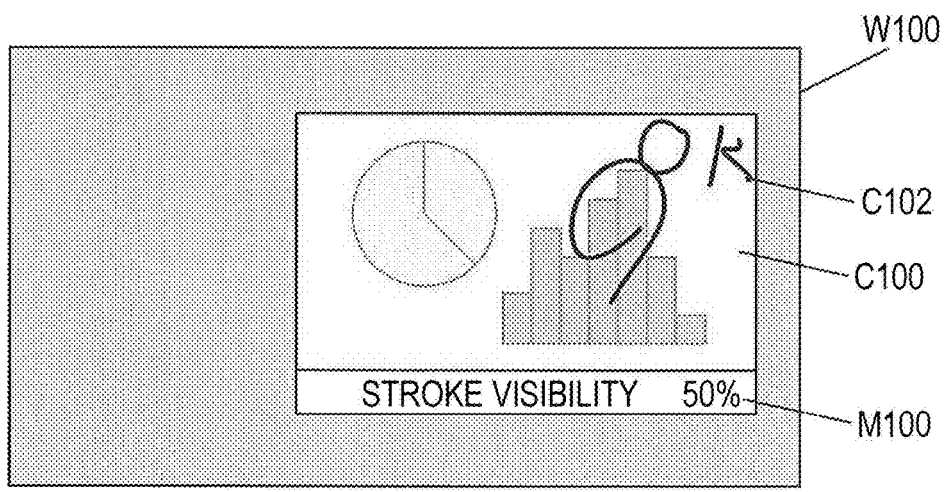
Figure 7C:
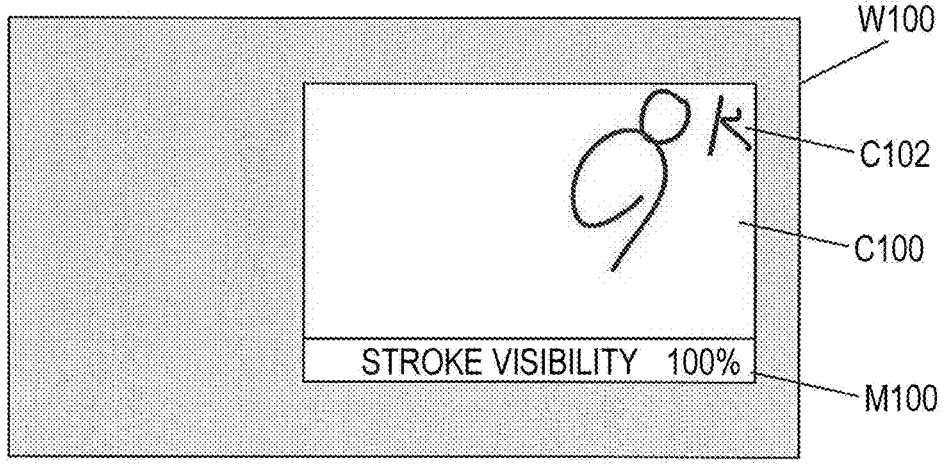

Operation examples of setting the stroke visibility is described with reference to FIG. 7A through FIG. 7C. FIG. 7A through FIG. 7C illustrate a specific display screen W100. An object is displayed on the display screen W100 (work area). More specifically, a content C100 is displayed, and a stroke C102 is overlay-displayed on the content C100. A visibility setting region M100 is located to set the stroke visibility.

FIG. 7A illustrates a stroke visibility of 0%. The content C100 is thus displayed, and the stroke C102 is drawn (displayed) on the content C100 in an overlaid fashion. In this state, the stroke background transmittance is set to be 100%.

FIG. 7B illustrates a stroke visibility of 50%. The content C100 is lightly displayed while the stroke C102 is displayed clearly on the content C100. In this case, the stroke background transmittance may be 50%, or may be a transmittance value corresponding to the stroke visibility of 50% (for example, a stroke background transmittance of 30%).

The stroke visibility and the stroke background transmittance are typically in a reverse relationship (for example, if the stroke visibility is 0%, the stroke background transmittance is 100%), but there are cases when the stroke visibility and the stroke background transmittance do not follow the reverse relationship. This is because there is a difference between a state in which the stroke is visible to the user and a display state if luminance is accounted for. The stroke visibility and the stroke background transmittance may be set in a simple reverse relationship or may be set in view of the user's visually recognizable state.

FIG. 7C illustrates a stroke visibility of 100%. The content C100 is whitened and invisible. The stroke background is clouded by setting the stroke background transmittance to be 0%. The user is unable to view the content C100 and views only the stroke C102.

In accordance with the first embodiment, the display state of the content (visibility state) may be changed by the user's setting of the transmittance (such as the stroke background transmittance) and the visibility (such as the stroke visibility). In accordance with the first embodiment, the display state of the content may be changed by clouding the stroke background in response to the background transmittance of the stroke overlaid on the content.

The visibility setting region M100 is set in a numerical value as illustrated in FIG. 7A through FIG. 7C, but a different method may be used in the setting of the visibility setting region M100. The stroke background transmittance may be modified (adjusted) by moving the slider as illustrated in FIG. 8A through FIG. 8C.

As illustrated in FIG. 8A, a content C100 and a stroke C102 are displayed on a display screen W110. A stroke background transmittance setting region M110 is also arranged. The stroke background transmittance setting region M110 includes a slider that varies the stroke background transmittance of the sheet of the display screen M110.

When the slider is laterally moved in the stroke background transmittance setting region M110, the stroke background transmittance varies. The stroke background transmittance is set to be 0% if the slider is at the left end of the range thereof as illustrated in FIG. 8A. The stroke background transmittance is set to be 50% if the slider is at the center of the range thereof as illustrated in FIG. 8B. The stroke background transmittance is set to be 100% if the slider is at the right end of the range thereof as illustrated in FIG. 8C.

The stroke background transmittance may be continuously changed by moving the slider. The stroke background transmittance may be changed in concert with or after the movement of the slider. The slider is arranged laterally as illustrated, but alternatively may be arranged in a vertical direction of the screen.

Separately from displaying the object, a menu and a setting window may be displayed, and the stroke background transmittance may be varied on the displayed menu and setting window.

2. Second Embodiment

A second embodiment is described below. In accordance with the second embodiment, the content visibility is varied by making the content transparent itself rather than using the stroke background in the setting of visibility. The following discussion focuses on a difference from the first embodiment.

FIG. 9 diagrammatically illustrates the setting of the content transparency, as the content visibility, from 0% to 100% from the rightmost portion to the leftmost portion thereof. The top portion of FIG. 9 diagrammatically illustrates how the layers of an object are decomposed, and the bottom portion of FIG. 9 illustrates the state of the object that is actually displayed.

The "content transparency" is a parameter that varies the visibility of the content. For example, the visibility of the content may be varied by setting the transmittance (transparency) of the content.

Unlike in the first embodiment, in the second embodiment, the object includes a content L20 and a stroke L24. More specifically, the second embodiment is different from the first embodiment in that there is no stroke background in the second embodiment.

Since the content transparency is 0% in a state C20, the content L20 is visibly displayed. More specifically, the stroke L24 is overlay-displayed on the content L20.

A state C22 indicates that the content transparency is increased to 50%. The content L20 is displayed in transparency. In this way, the content L20 is lightly displayed. Alternatively, the content L20 may be lightly displayed by increasing brightness or luminance.

The content L2 is not necessarily fully invisible, but is still displayed at a level closer to semi-transparency.

A state C24 indicates that the content transparency is 100%. In the state C24, the content L20 is not displayed and is thus invisible to the user. In the state C24, the content L20 is not visually displayed and only the stroke L24 is displayed.

In accordance with the second embodiment, the content is made transparent. Alternatively, the content may be set to be invisible by clouding the content. The content is whitened in the state C24 if the clouding is used. The content may be displayed in a different color. Such a color may be any color set by the user, or may be a default color of the content layer. The content may be set to be identical in color to the work area.

Figure 10:
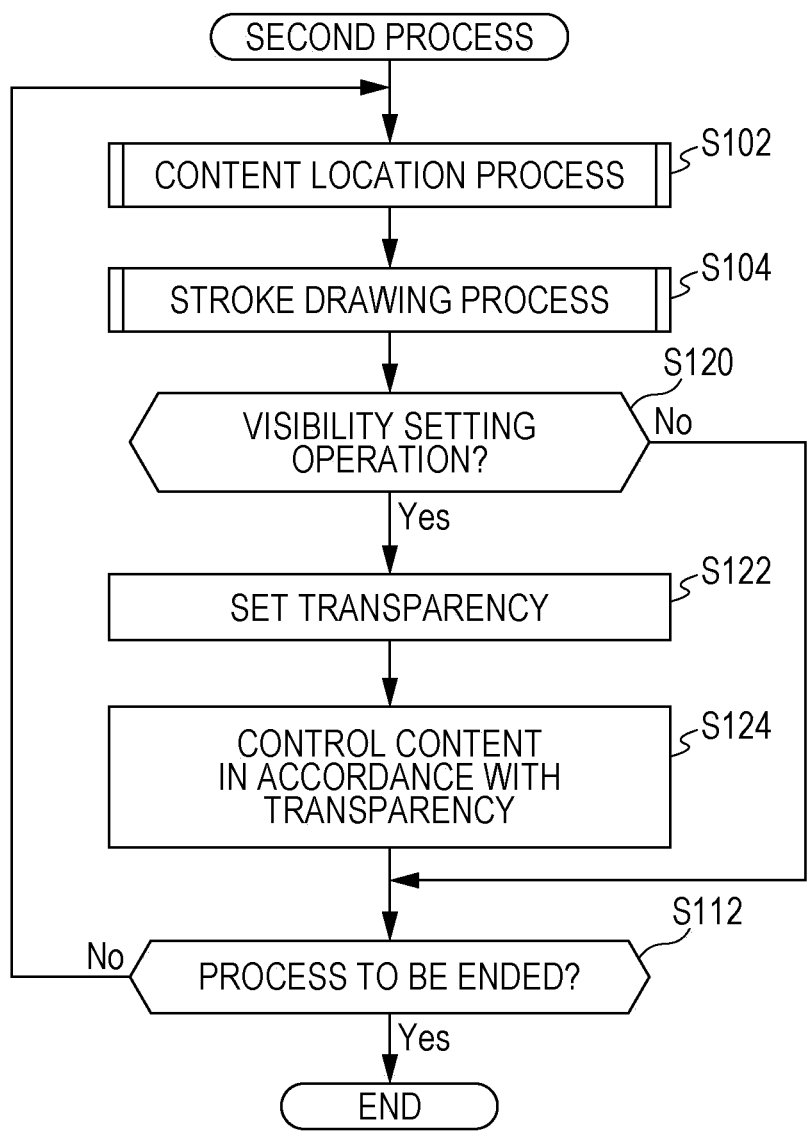
FIG. 10 is an operational flowchart illustrating the process of the second embodiment.

The process of the second embodiment is displayed in FIG. 10. The process of the second embodiment of FIG. 10 is identical to the first process of the first embodiment (FIG. 5) with steps S106 through S110 replaced with steps S120 through S124.

In accordance with the first embodiment, the stroke background is controlled by the stroke background transmittance to set the visibility of the stroke. In accordance with the second embodiment, a visibility control process of the content is performed in accordance with the transmittance of the content. More specifically, if a visibility setting operation, namely, a setting operation of content transparency is to be performed (yes branch from step S120), the content transparency is set in response to the setting operation of transparency (step S122). The content transparency is thus controlled by adjusting luminance or brightness of the content in response to the set transparency.

In accordance with the second embodiment, the content transparency is controlled by adjusting the luminance or brightness of the content itself.

3. Third Embodiment

A third embodiment is described below. In accordance with the first and second embodiments, the stroke is overlay-displayed on the content. Another content, other than the stroke, including text data, and vector data, may be overlaid. The functionality and process of the third embodiment are identical in principle to those of the second embodiment, and the following discussion focuses on only a difference therebetween.

Figure 11:
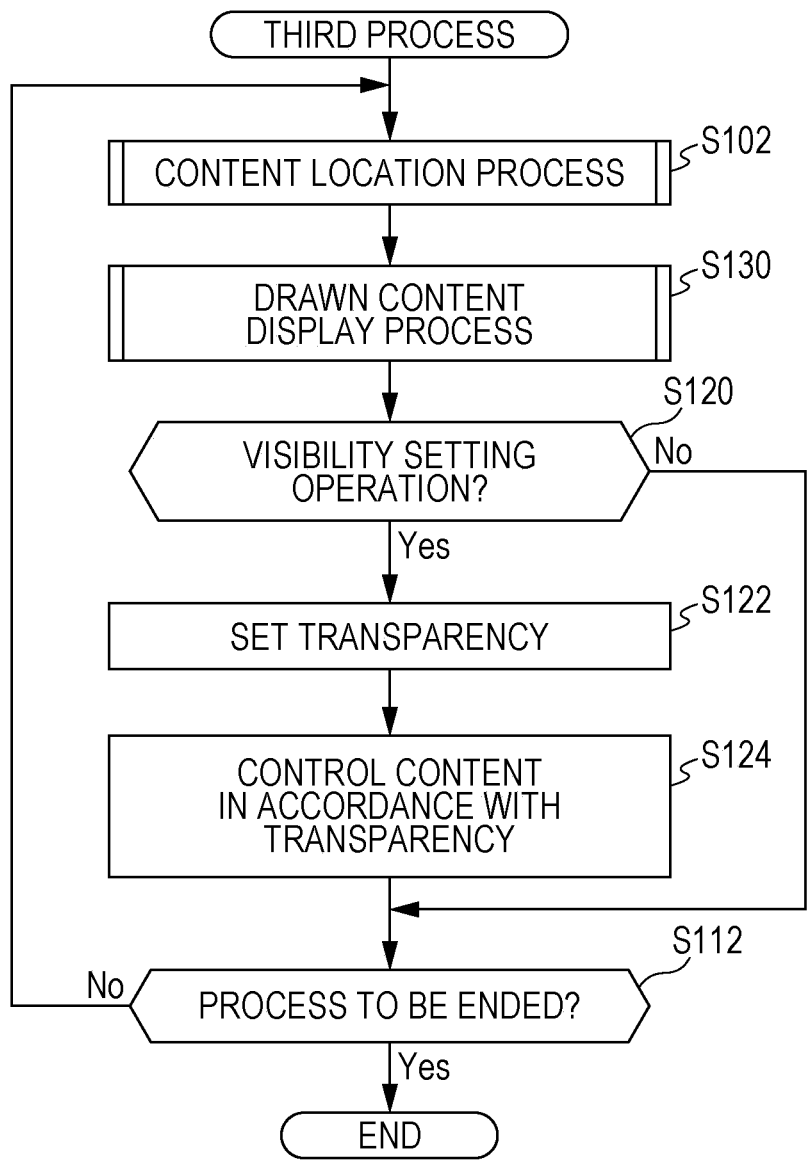
FIG. 11 is an operational flowchart illustrating a process of a third embodiment.

FIG. 11 illustrates the process of the third embodiment. The process of FIG. 10 is replaced with the process of FIG. 11. A drawn content display process (step S130) is performed instead of the stroke drawing process.

The drawn content includes text data, vector data, and other image files. For convenience of explanation, the drawn content is described as a content separate from the stroke of the second embodiment, but this does not preclude that the drawn content may include a stroke. The text data may include characters, numbers, and symbols.

Figure 12A:
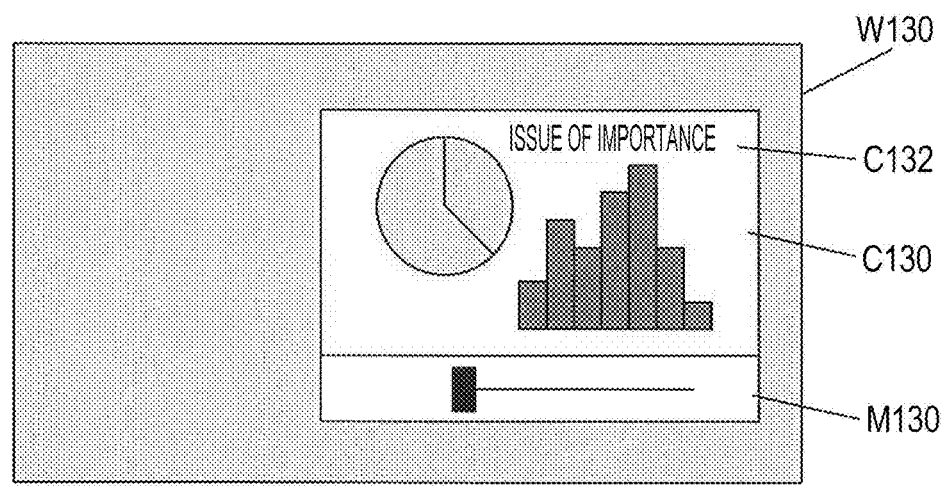
FIG. 12A through FIG. 12C illustrate operation examples of the third embodiment.
Figure 12B:
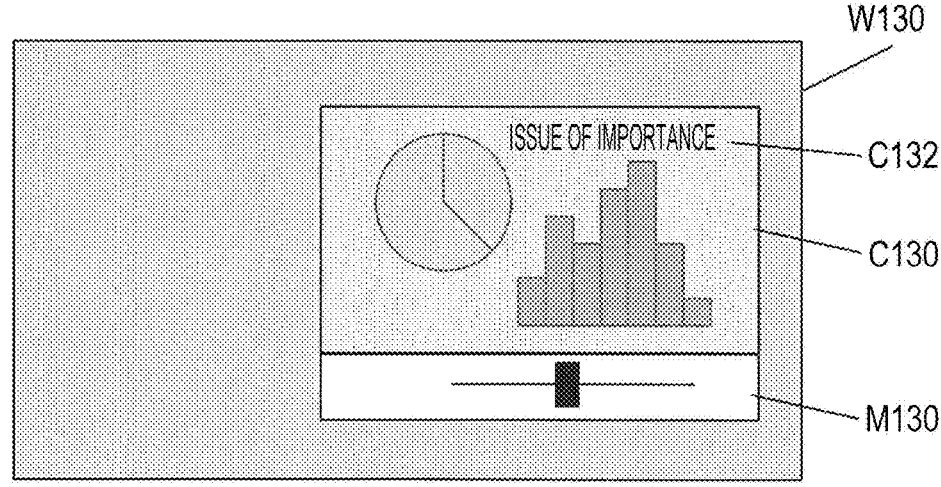
Figure 12C:
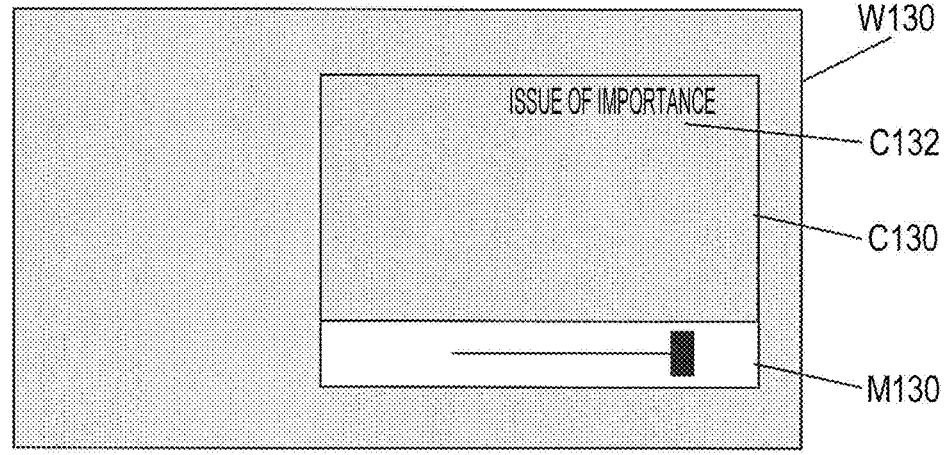

FIG. 12A through FIG. 12C specifically illustrate a display screen W130. A content C130 is displayed on the display screen W130 (work area). Text C132 is displayed as a drawn content on the content C130. A content transparency setting region M130 is arranged in the content C130 to set content transparency. A slider serving as a transparency setting unit is displayed in the content transparency setting region M130.

Referring to FIG. 12A, a content transparency of 0% is set. The content C130 is thus displayed, and the text C132 is overlay-displayed on the content C130.

Referring to FIG. 12B, a content transparency of 50% is set. The content C130 is slightly lightly displayed, and the text C132 is clearly displayed.

Referring to FIG. 12C, a content transparency of 100% is set. The display screen W130 is seen through the content C130 and the content C130 is invisible. The user is able to view the text C132 only.

In accordance with the second embodiment, other contents, including not only the stroke but also text, may also be similarly processed.

4. Fourth Embodiment

A fourth embodiment is described below. In accordance with the fourth embodiment, an area that is affected by the setting of the visibility is not limited to each object but covers the whole work area. The functionality and process of the fourth embodiment are identical in principle to those of the second embodiment (or the first embodiment), and the following discussion focuses on only a difference therebetween.

Figure 13:
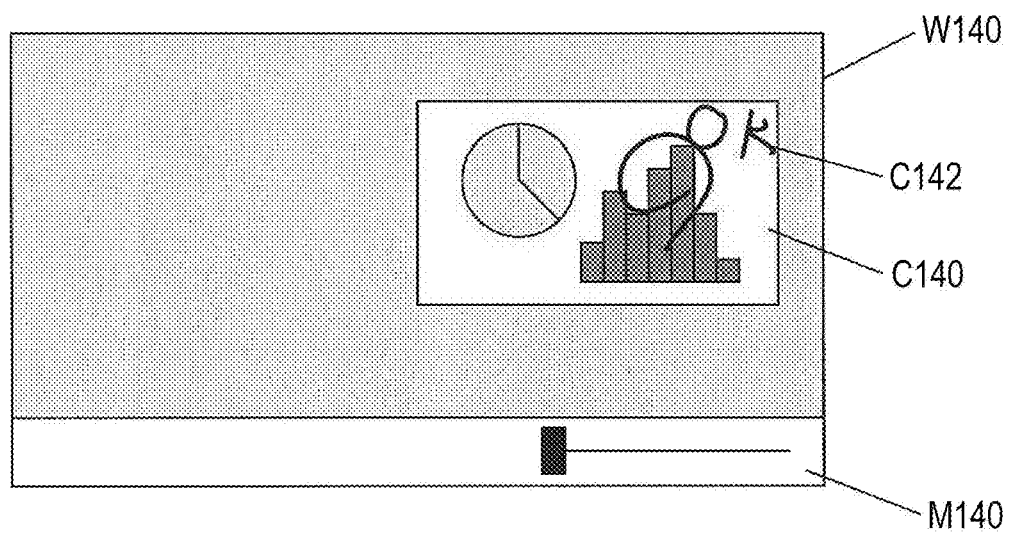
FIG. 13 illustrates an operation example of a fourth embodiment.

FIG. 13 illustrates an operation example of the fourth embodiment. A stroke C142 is drawn on a content C140 in a display screen W140 of FIG. 13. A visibility setting region M140 is arranged on a bottom portion of the work area, and a slider is displayed as a visibility setting unit.

Referring to FIG. 13, only one visibility setting region M140 is displayed in the work area. The visibility of the content of the object displayed in the work area is controlled by operating the visibility setting unit (slider) in the visibility setting region M140.

In this case, the visibility may be varied by controlling the visibility of all objects arranged in the work area or by controlling the visibility of an object selected from the work area.

The visibility may be controlled in accordance with another condition. For example, the visibility may be controlled depending on the type of each content, or depending on whether a stroke is included (a stroke is displayed).

5. Fifth Embodiment

A fifth embodiment is described below. In accordance with the fifth embodiment, a region where the visibility is to be set is not arranged, and the visibility of a stroke or a content may be varied in response to the user's operation. The functionality and process of the fifth embodiment are identical in principle to those of the first embodiment, and the following discussion focuses on only a difference therebetween.

Figure 14:
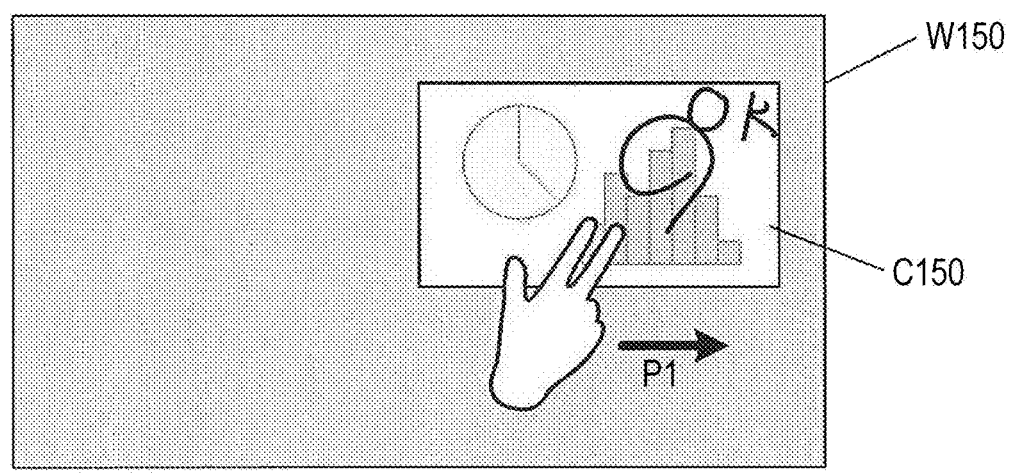
FIG. 14 illustrates an operation example of a fifth embodiment.

Specifically the stroke background transmittance is set by detecting the user's operation when the stroke background transmittance is to be set by performing the transmittance setting operation in steps S106 and S108 of FIG. 5. The fifth embodiment is described with reference to a display screen W150 of FIG. 14.

A content C150 is displayed on the display screen W150. The user may change the stroke background transmittance using two fingers to perform a swipe operation on the content C150. For example, if the user performs the swipe operation in a direction labeled P1, the stroke background transmittance is increased, and if the user performs the swipe operation in a direction opposite to the direction labeled P1, the stroke background transmittance is decreased.

The current stroke background transmittance may be displayed on the display screen. The stroke background transmittance may be displayed during (or after) the swipe operation, or may be normally displayed.

In accordance with the fifth embodiment, the stroke background transmittance is varied and the display mode is switched without arranging the transmittance setting region. Alternatively, the content transparency may be set instead of the stroke background transmittance. The embodiments described above may be combined. For example, the transparency may be set using the same operation even when the transparency setting region is displayed.

6. Sixth Embodiment

A sixth embodiment is described below. In accordance with the sixth embodiment, multiple parameters are varied using the same operation (continuous operation) to vary the visibility of the stroke or the content. In accordance with the sixth embodiment, the visibility balance may be varied in setting the visibility. The visibility balance may be determined by the content transparency (the transparency of the content) and the stroke background transmittance (the background transmittance of the stroke). These two parameters are varied using the same operation. The functionality and process of the sixth embodiment are identical in principle to those of the embodiments described above, and the following discussion focuses on only a difference therebetween.

Figure 15:
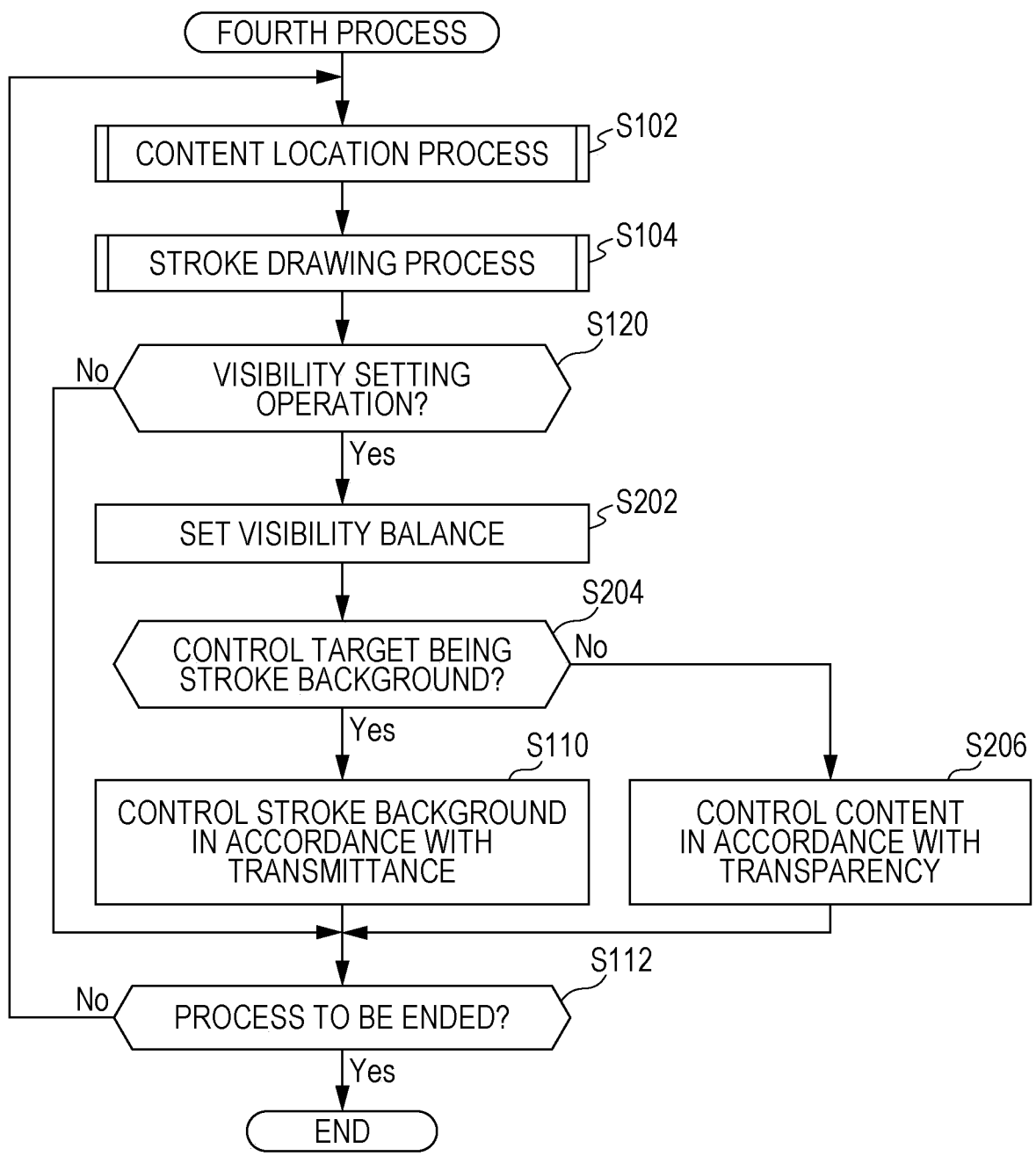
FIG. 15 is an operational flowchart illustrating a process of a sixth embodiment.

In accordance with the sixth embodiment, each of the first process of the first embodiment of FIG. 5 and the second process of the second embodiment of FIG. 10 is replaced with a fourth process of FIG. 15.

The visibility balance is set by performing the visibility setting operation. The visibility balance affects how the content and stroke appear to the user. The visibility setting operation selects between controlling the stroke background transmittance and controlling the content transparency.

When the visibility setting operation controls the stroke background, the stroke background transmittance is varied in a way similar to the first embodiment. In this way, only the stroke is displayed to be viewed (in a step sequence of yes branch from step S120→step S202→yes branch from step S204→step S110). In such a case, the stroke background displayed in front of the content is clouded, and the stroke is drawn and displayed on a white background. More specifically, not only the content is invisible to the user, but also another content in the background of the content and the work area are invisible to the user.

In contrast, when the content is made transparent by performing the visibility setting operation, an operation to make the content itself transparent is performed. In other words, the content transparency is set depending on the visibility balance. The content control process is performed in accordance with the set content transparency (in a step sequence of from yes branch from step S120→step S202→no branch from step S204→step S206).

If the content transparency reaches 100%, the content becomes transparent. In this way, the work area located behind the content, and another content located behind the content are displayed.

FIG. 16 diagrammatically illustrates the state of each layer when the visibility balance of the content and the stroke varies in the sixth embodiment. The content transparency is controllable in an area extending from the center to the left end portion (extending from C30 to C32), and a state of "transparent content" is reached at the left end portion. The stroke background transmittance is controllable in an area extending from the center to the right end portion, and the stroke background reaches a transmittance of 0% at the right end portion. The top portion of FIG. 16 diagrammatically illustrates each layer of the object decomposed, and the bottom portion of FIG. 16 illustrates the state of the object actually displayed.

A state C32 located nearly at the center of FIG. 16 has a content transparency of 0% and a stroke background transmittance of 100%. A content L30 is clearly displayed, and a stroke L34 is overlay-displayed. In other words, since the stroke background transmittance of a stroke background L32 is 100%, the content L30 and the stroke L34 are visibly displayed.

A state C34 has a stroke background transmittance of 0%. In the state C34, the stroke background L32 has a stroke background transmittance of is 0%, is thus clouded and whitened. The content is invisible because the whitened stroke background L32 is displayed in front of the content L30. In the state C34, the stroke L34 is displayed in white.

The state C34 has typically the same content transparency as the state C32, and has a content transparency of 0% here. If the stroke background transmittance is 0%, the content is invisible because the stroke background is clouded. The stroke background transmittance may be a value other than 0%. For example, if the minimum value of the content transparency is 10% (with a content transparency of 10% in the state C32 of FIG. 16), the content transparency remains the same, namely, 10% toward the state C34.

A state C30 indicates that the content is transparent. In the state C30, the stroke background transmittance of the stroke background L32 is 100%, and the content transparency of the content L30 is also 100%. More specifically, since the content L30 is transparent and thus invisible, the stroke L34 and the background of the content L30 (such as the work area) are displayed.

A specific display window W160 is described below with reference to FIG. 17A through FIG. 17C. A content C160 is displayed on the display window W160 (work area). A stroke C162 is overlay-displayed on the stroke C162. A visibility balance setting region M160 that displays a visibility balance setting unit is arranged on the content C160 to set the visibility balance.

Figure 17A:
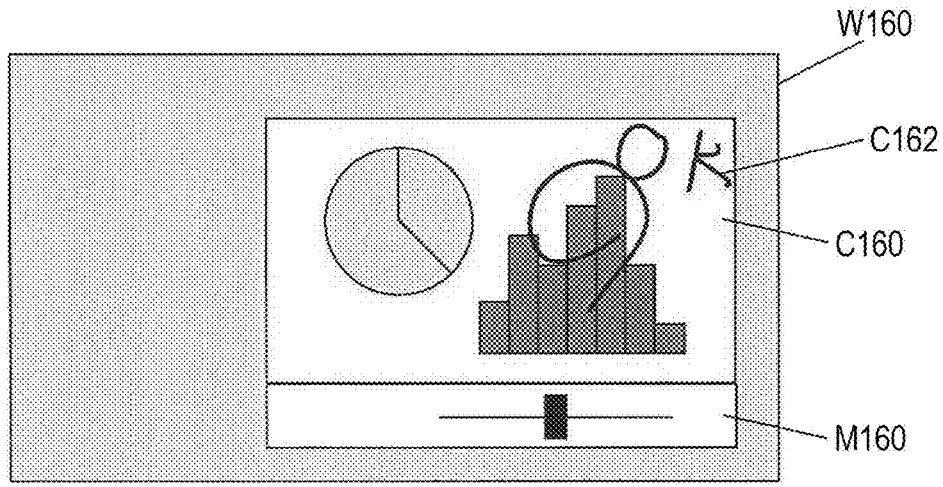
FIG. 17A through FIG. 17C illustrate operation examples of the sixth embodiment.

FIG. 17A illustrates a display state in which a slider is located at the center of a slider range. In this setting, the content transparency is set to be 0% and the stroke background transmittance is set to be 100%. The slider as the visibility balance setting unit displayed on the visibility balance setting region M160 is located at the center. The content C160 is visibly displayed, and the stroke C162 is drawn (displayed) on the content C160 in an overlaid fashion. The user may thus visibly recognize the content C160 and the stroke C162.

Figure 17B:
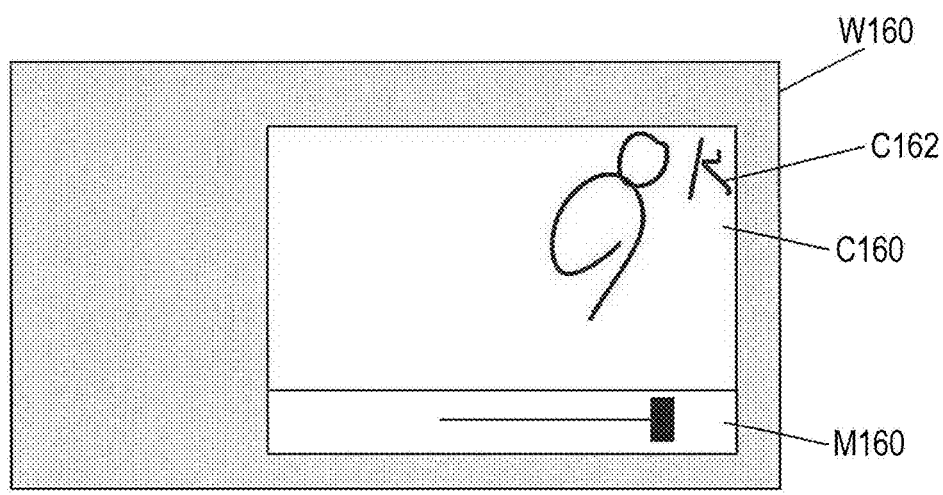

FIG. 17B illustrates the display state in which the slider is moved to the right end of the slider range from the state of FIG. 17A. In this case, the visibility balance is controlled by the stroke background transmittance, and the stroke background transmittance is set to be 0% in FIG. 17B. The content C160 is not visibly recognized. The stroke background transmittance is set to be 0%, and is thus clouded. The user is unable to visibly recognize the content C160 but is able to visibly recognize only the stroke C162. Since the stroke background is clouded, the inside of the outline where the content has been displayed may be displayed in white.

Figure 17C:
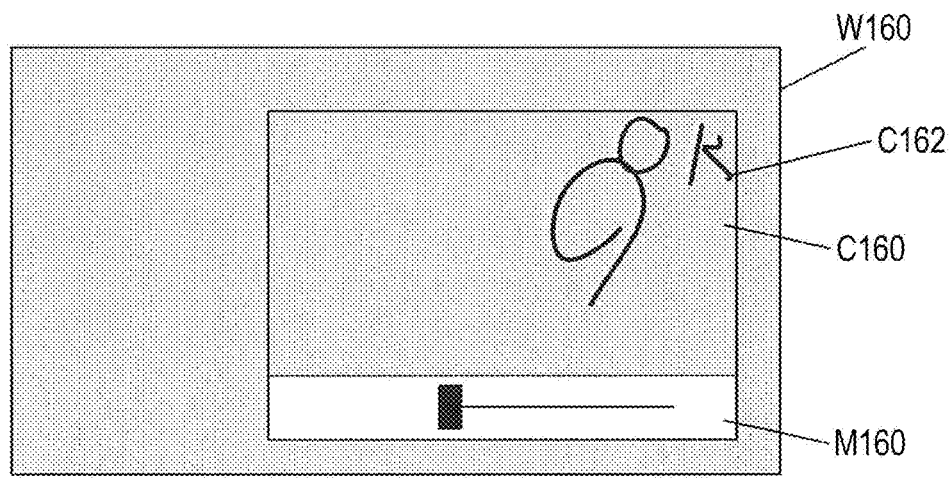

FIG. 17C illustrates the display state in which the slider is moved to the left end of the slider range. In this case, the visibility balance is controlled by the content transparency, and the content transparency is set to be 100% in FIG. 17C. The content C160 becomes transparent and is thus invisible to the user. Referring to FIG. 17C, the stroke background transmittance is set to be 100%, and the transparency of the content C160 is set to be 100%. Another object present behind the background of the content and the work area are displayed as they are, and the stroke on the sheet displayed within the outline of the content is displayed. The outline of the content may or may not be displayed.

In accordance with the sixth embodiment, if the visibility balance is set with the visibility set, both the content transparency and the stroke background transmittance may be varied by the same operation. This arrangement allows the user to visibly recognize only the stroke, and also allows the content to be visible or invisible to the user. Even if the content is not displayed, the content may be simply clouded or set to be transparent. The work area beneath the content and the content may be displayed.

In accordance with the sixth embodiment, one of the content transparency and the stroke background transmittance is controlled using a single operation unit. Which of the content transparency and the stroke background transmittance is to be controlled may be preset or is to be determined depending the type or state of a content.

In accordance with the sixth embodiment, a single operation unit is used to handle different parameters. Any of the parameters may be varied or two parameters may be concurrently varied by the operation unit.

Referring to FIG. 16, the stroke background transmittance and the content transparency may be interchanged and then set, or may be operated in a similar way. In the center portion of FIG. 16, the setting of the two parameters may be changed.

A stroke background transmittance of 100% corresponds to a content transparency of 0%. Alternatively, a stroke background transmittance of 100% corresponds to a content transparency of 20%. In such a case, a range of the stroke background transmittance of from 100% to 80% may correspond to a range of the content transmittance of from 20% to 0%.

7. Seventh Embodiment

A seventh embodiment is described below. In accordance with the seventh embodiment, setting the visibility is making the stroke itself transparent. The functionality and process of the seventh embodiment are identical in principle to those of the first and sixth embodiments described above, and the following discussion focuses on only a difference therebetween.

Figure 18:
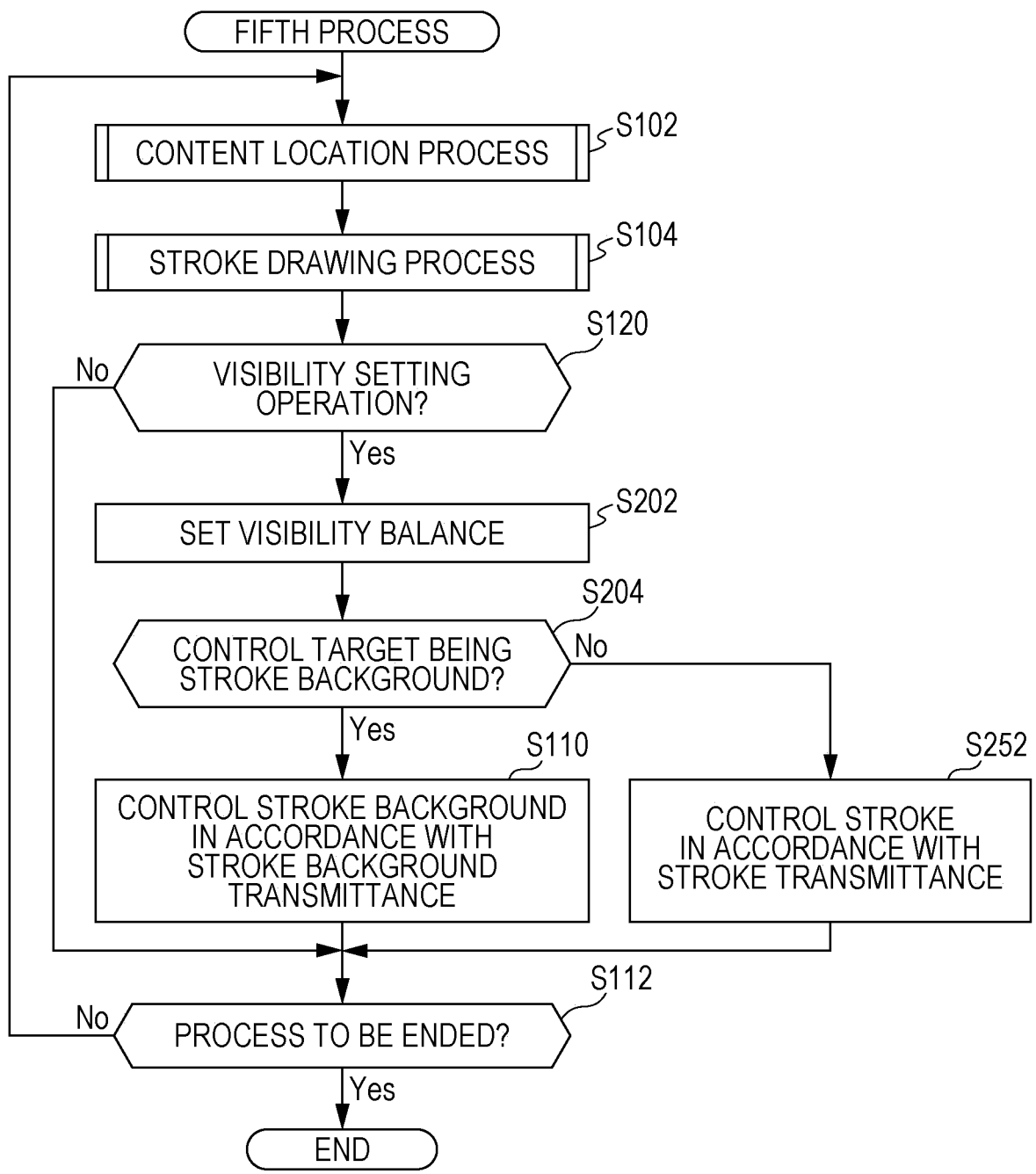
FIG. 18 is an operational flowchart illustrating a process of a seventh embodiment.

In accordance with the seventh embodiment, the fourth process of the sixth embodiment of FIG. 15 is replaced with a fifth process of the seventh embodiment of FIG. 18.

In the operation to set the visibility, the visibility balance is set. If a control target is the stroke background (yes branch from step S204) in the same way as described with reference to the embodiments, the stroke background is controlled based on the stroke background transmittance (in a step sequence of yes branch from step S120→step S202→yes branch from S204→step S110).

If the stroke is controlled as the visibility balance (no branch from step S204), a control operation is performed on a graphic drawn by a stroke in accordance with the transmittance of the set stroke (stroke transmittance) (step S252). The stroke is visibly displayed if the stroke transmittance is 0%, but is not visibly recognizable (not displayed) if the stroke transmittance is 100%.

Figure 19:
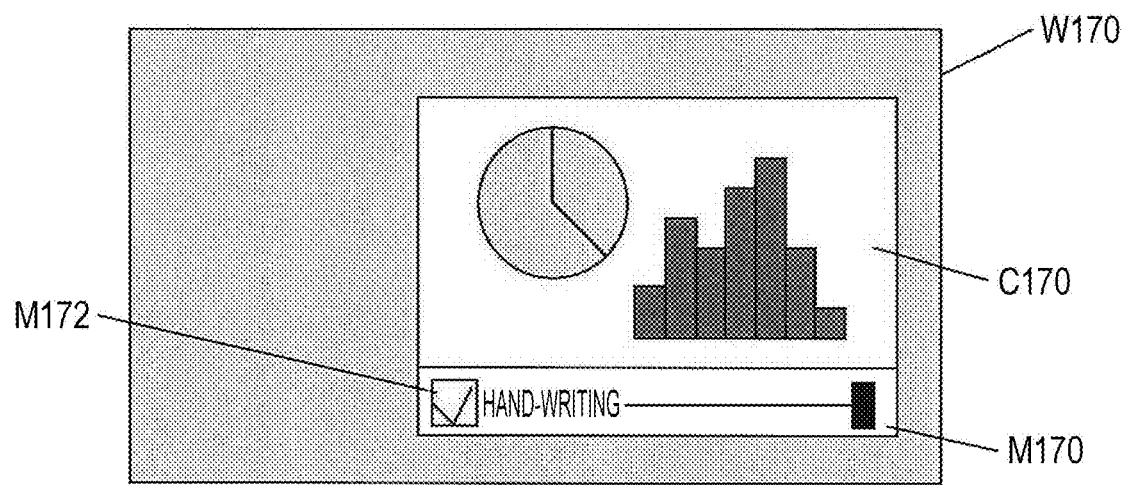
FIG. 19 illustrates an operation example of the seventh embodiment.

FIG. 19 illustrates an example of a display screen W170 of the seventh embodiment. A content C170 is displayed as an object on the display screen W170. A visibility balance setting region M170 is arranged below the content C170.

A display of a content (such as a stroke background) may be controlled by operating a slider displayed in the visibility balance setting region M170. In accordance with the seventh embodiment, a stroke select mark M172 with a check box is arranged in the visibility balance setting region M170. By selecting the stroke select mark M172, a control operation (transmittance operation) is performed on the stroke. The stroke select mark M172 has the check box, but may be another user interface (UI), such as a select icon, a radio button, or a pull-down menu display.

In the display screen W170 of FIG. 19, the stroke select mark M172 is selected and the slider is positioned at the right end of the range thereof. In such a case, the stroke transmittance reaches 100%, causing the stroke to be invisible (in a non-displayed state).

In accordance with the seventh embodiment, the transmittance operation as the visibility balance setting is performed not only on the content but also on the stroke. Switching between visibility and invisibility, namely, switching between the displayed state and the non-displayed state is performed.

8. Eighth Embodiment

An eighth embodiment is described below. In accordance with the eighth embodiment, the visibility balance is changed by referencing input identification information. The functionality and process of the eighth embodiment are identical in principle to those of the first and second embodiments described above, and the following discussion focuses on only a difference therebetween.

Figures 20, 21:
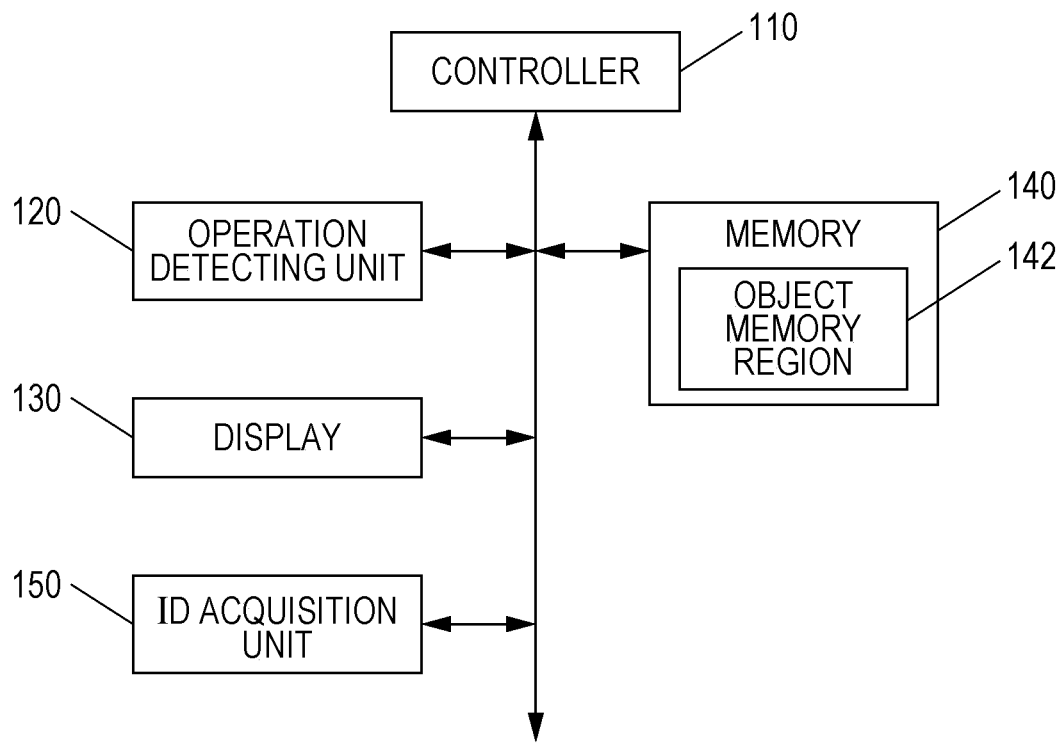
FIG. 20 illustrates a functional configuration of an eighth embodiment.
FIG. 21 illustrates an example of a data structure of an object of the eighth embodiment.

FIG. 20 illustrates a functional configuration of the eighth embodiment that is substituted for the functional configuration of the first embodiment of FIG. 2. The functional configuration of the eight embodiment includes an ID acquisition unit 150 in addition to the functional configuration of FIG. 2.

The ID acquisition unit 150 acquires an identification identifying the user. For example, the user who has input a stroke (entered hand-writing) is identified by ID (an identification signal) output from an operation pen used.

FIG. 21 illustrates a data structure of an object stored on the object memory region 142 of the eighth embodiment. The object is stored in association with the ID. By storing the content or the stroke in association with the ID, the content or the stroke may be identified on a per ID basis (on a per user basis).

Figure 22:
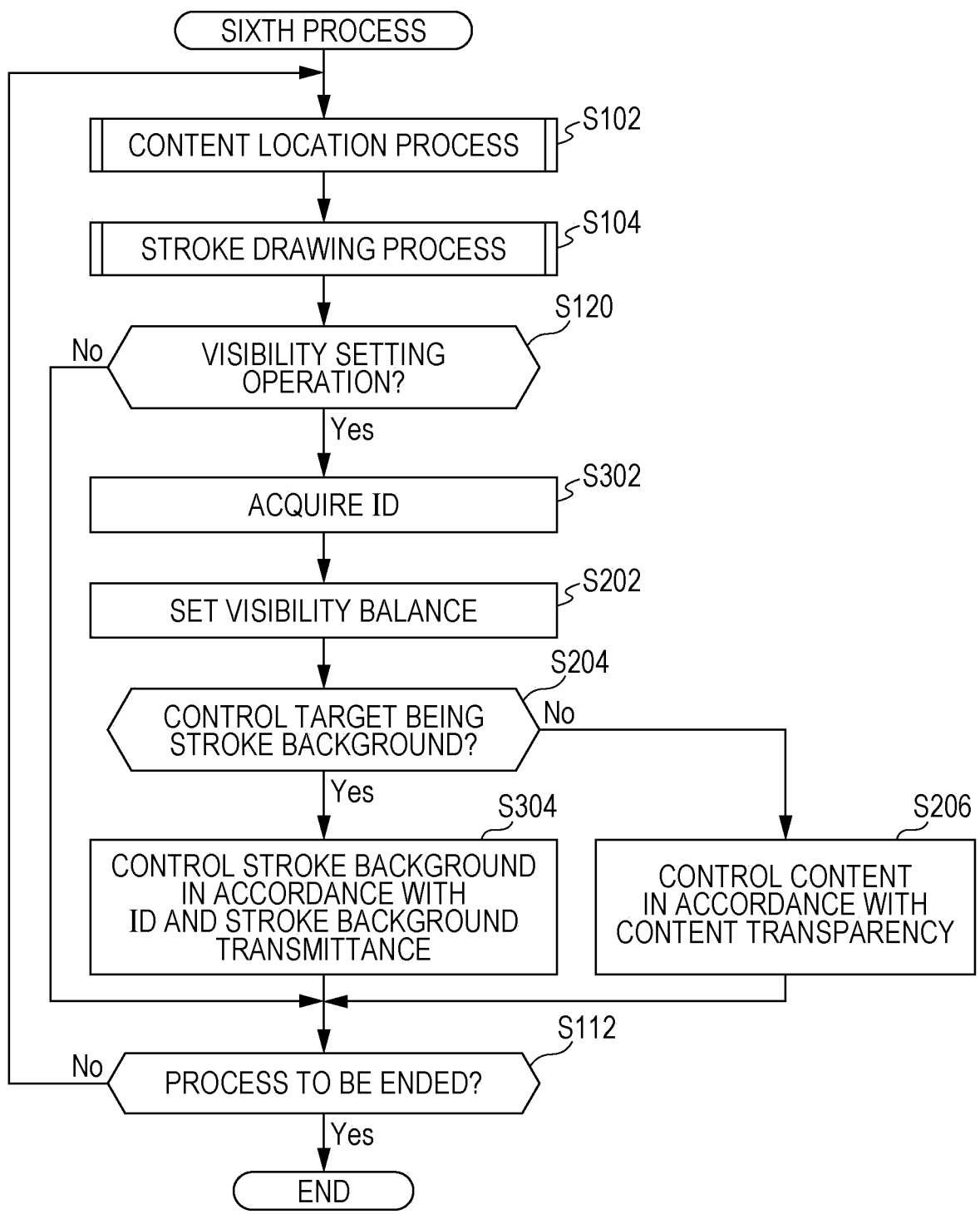
FIG. 22 is an operational flowchart illustrating a process of the eighth embodiment.

FIG. 22 illustrates a sixth process that is substituted for the second process of the second embodiment of FIG. 10. If the visibility setting operation is performed (yes branch step from S120), the ID output from the operation pen is acquired (step S302).

As a method of acquiring the ID, the ID of the operation pen that has performed the visibility setting operation may be acquired, or any ID that the user has selected may be acquired. If the visibility balance is changed to perform an operation on the stroke background in the visibility setting operation, the control operation is performed on the stroke background in accordance with the ID and the transmittance (the stroke background transmittance) (in a step sequence of from step S202→yes branch from step S204→step S304).

If the visibility balance is changed to vary the content transparency, the content control operation is performed in accordance with the content transparency (in a step sequence of from step S202→no branch from step S204→step S206).

Figure 23A:
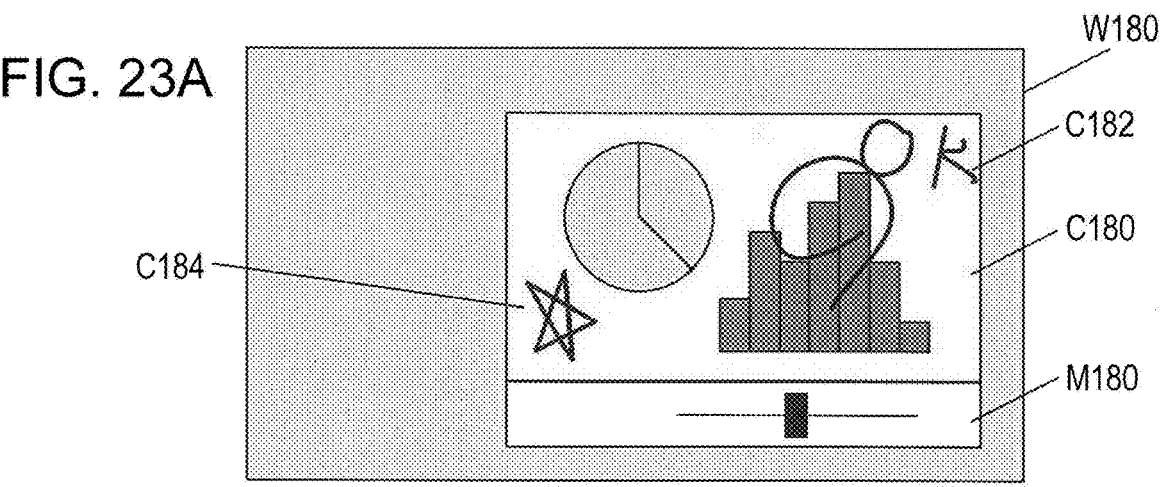
FIG. 23A through FIG. 23C illustrate operation examples of the eighth embodiment.
Figure 23B:
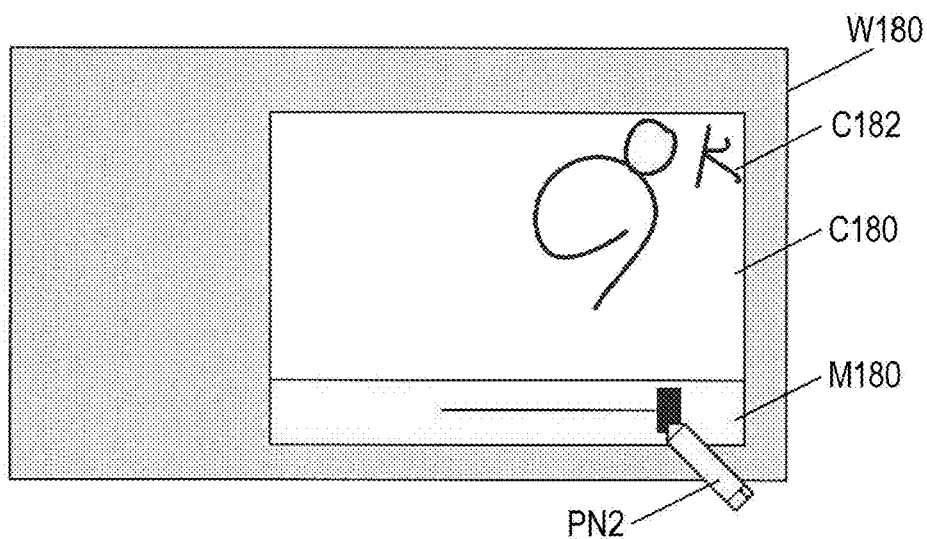
Figure 23C:
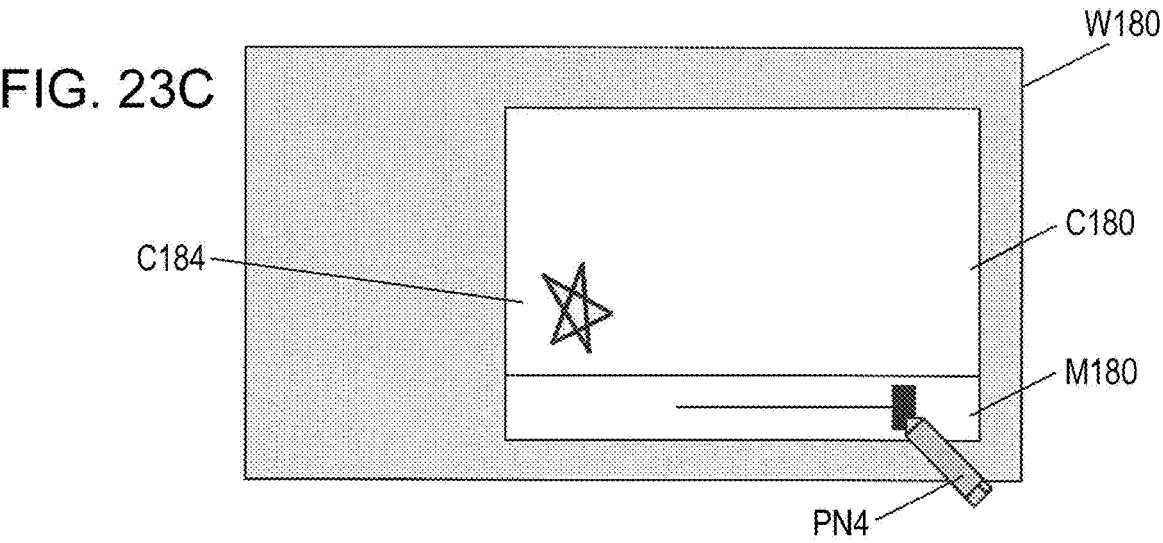

FIG. 23A through FIG. 23C illustrate an example of a display screen W180 that explains an operation of the eighth embodiment. The display screen W180 of FIG. 23A displays a content C180, a stroke C182, and a stroke C184.

The stroke C182 has ID 001, and the stroke C184 has ID 002. More specifically, the stroke C182 and the stroke C184 are drawn by different users.

FIG. 23B illustrates an operation of the user identified by ID 001 who has operated a slider as a visibility balance setting unit in a visibility balance setting region M180. If the slider is moved to the right end of the range thereof, the stroke background transmittance corresponding to the stroke C182 becomes 0%, causing the stroke background to be clouded. In this way, only the stroke C182 is displayed (in a state that the user is able to visibly recognize). More specifically, the content C180 and the stroke C184 are not displayed (the user is unable to visibly recognize).

The ID 001 for the user may be obtained by acquiring an ID selected by the user in a menu. As illustrated in FIG. 23B, an ID 001 of a pen PN 2 that has operated the slider is detected, and the detected ID may be set to be an acquired ID.

Similarly, FIG. 23C illustrates an operation in which the user of ID 002 operates the slider as the validity balance setting unit in the visibility balance setting region M180. When the user moves the slider to the right end of the range thereof, the stroke background transmittance corresponding to the stroke C184 becomes 0%, and the stroke background is clouded. In this way, only the stroke C184 is displayed (visibly recognized by the user). More specifically, both the content C180 and the stroke C182 are not displayed (not visibly recognized by the user).

The method described may be implemented such that the user may visibly recognize the stroke corresponding to the ID. For example, the order of layers may be appropriately changed. More specifically, the stroke and the stroke background corresponding to the ID are re-drawn on the frontmost position. In this way, the stroke desired by the user becomes visible. Furthermore, a stroke other than a stroke of currently of interest may be imaged and then displayed on another layer.

In the process described above, the ID is obtained after the visibility setting operation (the visibility balance setting operation). Alternatively, the ID may be obtained prior to the visibility setting operation. More specifically, step S302 may be performed prior to step S120. Alternatively, the ID may be obtained concurrently with performing the visibility setting operation.

In accordance with the eighth embodiment, the operation of each pen may select between the stroke that is enabled to be visible and the stroke that is not visibly recognizable (not displayed).

The identification method of each user is performed using the ID of each operation pen. Another identification method may be used. For example, the user may select any identification information, or may select using a touch button. If multiple pens are available, a particular pen only may be used in the manner described above.

9. Ninth Embodiment

A ninth embodiment is described below. In accordance with the ninth embodiment, an operation of each user may be performed on the entire object. The functionality and process of the seventh embodiment are identical in principle to those of the eighth embodiment described above, and the following discussion focuses on only a difference therebetween.

Figure 24:
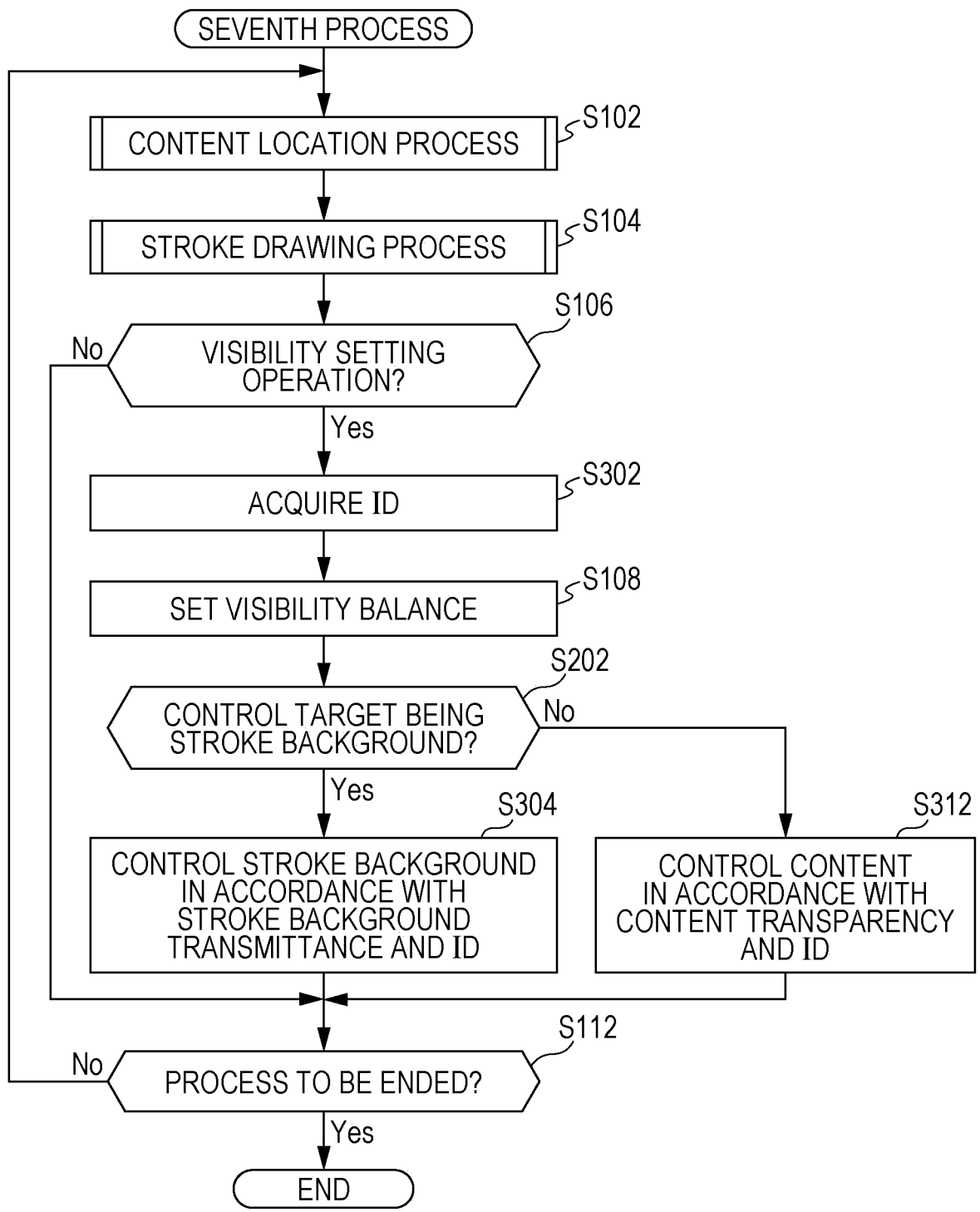
FIG. 24 is an operational flowchart illustrating a process of a ninth embodiment.

In accordance with the ninth embodiment, the sixth process of the eighth embodiment of FIG. 22 is replaced with a seventh process of FIG. 24. The difference between the sixth process and the seventh process is that step S312 is performed instead of step S206 of the sixth process.

A similar process may be performed on the content in addition to the process of the eighth embodiment. When the content is made transparent, the content control operation is performed in accordance with the content transparency and the ID (step S312). The content control operation may be performed on the whole object arranged in the work area.

Figure 25A:
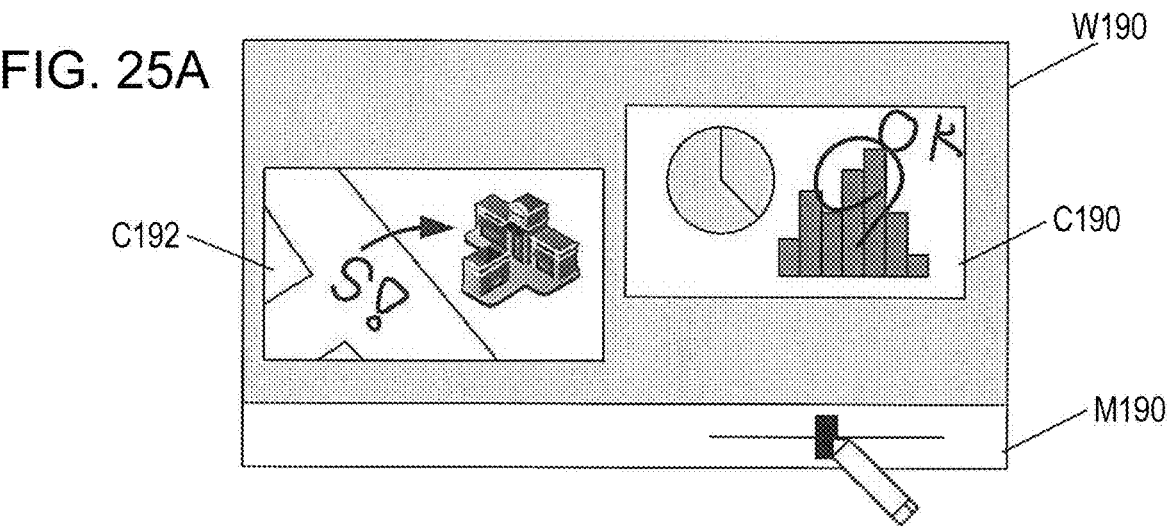
FIG. 25A through FIG. 25C illustrate operation examples of the ninth embodiment.
Figure 25B:
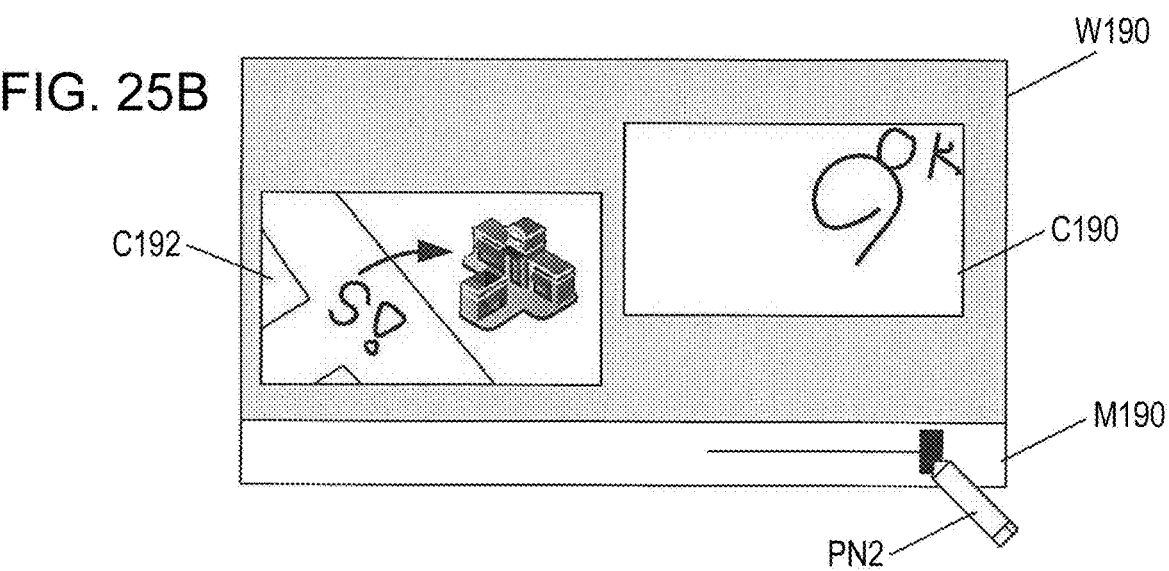
Figure 25C:
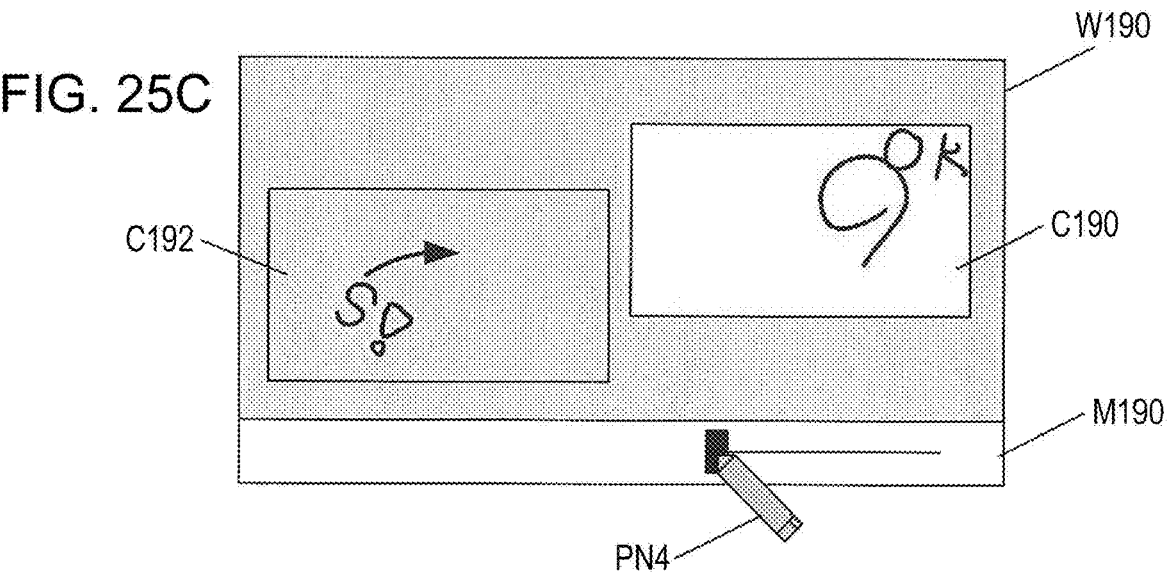

FIG. 25A through FIG. 25C illustrate examples of a display screen W190 that explains the process of the ninth embodiment. An object C190 and an object C192 are displayed on the display screen W190 of FIG. 25A. A content and a stroke are overlaid-displayed on each of the object C190 and the object C192. The object C190 is located by a user having ID001 and the object C192 is located by a user having ID 002.

A visibility balance setting region M190 is displayed on the display screen W190. By operating a slider serving as a visibility balance setting unit displayed in the visibility balance setting region M190, the stroke background transmittance or the content transparency may be controlled as the visibility balance.

FIG. 25B illustrates the slider that is moved to the right end of the range thereof by a pen PN2. Identification ID 001 is assigned to the pen PN2. If the stroke background transmittance becomes 0% with respect to the object C190, the stroke background is clouded, and the stroke is displayed on a white background.

FIG. 25C illustrates a slider that is moved to the left end of the range thereof by a pen PN4. Identification ID 002 is assigned to the pen PN4. The content is made transparent with respect to the object C192 (the content transparency becomes 100%), and the stroke is displayed on the object.

In accordance with the ninth embodiment, a batch visibility balance change process may thus be performed on related objects using the ID.

10. Tenth Embodiment

A tenth embodiment is described below. In accordance with the tenth embodiment, contents are displayed again in accordance with the visibility balance set in each of the above embodiments or in accordance with the visibility balance (such as the stroke background transmittance or the content transparency) set when the object is located.

More specifically, information stored on the object memory region 142 is stored on another storage region. Information concerning an object to be stored on this storage region is information of FIG. 3.

When the stored information concerning the object is read again, the previous location of the object, and the stroke background transmittance, and the content transparency are reproduced. More specifically, the controller 110 locates the content in the work area in accordance with the information concerning the object. After locating the content, the controller 110 draws the stroke in accordance with the stroke data. By performing the same operation as the operation to read the stroke background transmittance and the content transparency, the controller 110 reproduces the state of the object located in the work area.

11. Modifications

The embodiments have been described with reference to the drawings. More specifically, the disclosure is not limited to the embodiments, and designs that do not depart from the scope of the disclosure fall within the scope defined by the claims.

In accordance with the embodiments, a touch operation (tapping operation) is performed on a touch panel serving as an operation detecting unit. Alternatively, a click operation may be performed using an external input device, such as a mouse.

In accordance with the embodiments described above, the touch panel including the display 130 and the operation detecting unit 120 in a unitary body is used. Another mechanism may be used to implement the embodiments of the disclosure. For example, the display 130 may a projector, and the operation detecting unit 120 may be a human sensor. A controlling computer may be connected to the operation detecting unit 120 and the display 130 to implement a display system.

For convenience of explanation, elements of the embodiments have been described separately, but they may be combined in a technically viable range. The operation of the fifth embodiment may be performed in combination with another embodiment. The first and second embodiments are related to the method of the content transmittance control, and the method may be performed in combination with another embodiment.

The embodiments described in the specification may be performed in combination as long as the combination is consistent.

A program running on each of the apparatus in each of the embodiments controls a central processing unit (CPU) (program controlling a computer) to implement the functionalities of each embodiment. Information to be handled by the apparatus may be temporarily stored on a temporary storage device (such as a random-access memory (RAM)) during process, and then stored on a read-only memory (ROM), a hard disk drive (HDD), or solid state drive (SSD), and read, corrected, and re-written as appropriate by the CPU.

To circulate the program in the market, the program may be stored on a portable recording medium for circulation, or may be transmitted to a server computer via a network, such as the Internet. In such a case, a storage device of the server computer falls within the scope of the disclosure.

The present disclosure contains subject matter related to that disclosed in Japanese Priority Patent Application JP 2017-101197 filed in the Japan Patent Office on May 22, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
an object display that displays in a display region an object including a content, and a stroke drawn on the content in an overlaid fashion;
a visibility balance setting processor that sets a visibility balance of the displayed content, the visibility balance setting processor including a content transparency setting processor that controls content transparency serving as transparency of the content;
a stroke background transmittance setting processor that controls stroke background transmittance that is transmittance of a background of the drawn stroke;
an operation display that displays an operation interface that is used to set the visibility balance; and
a setting operation interface that sets the content transparency and the stroke background transmittance, wherein
the operation interface includes the setting operation interface,
the setting operation interface is a slider that moves along a straight line,
a range from one point to one end point along the straight line of the slider is where the content transparency is set,
a range from the one point to another end point along the straight line of the slider is where the stroke background transmittance is set, and
the content transparency and the stroke background transmittance are set simultaneously by moving the slider along the straight line.

2. The display apparatus according to claim 1, wherein the content becomes transparent as the slider is moved from the one point toward the one end point and the background of the stroke becomes clouded as the slider is moved from the one point to the another end point.

3. The display apparatus according to claim 1, further comprising an identification information acquisition processor that acquires identification information of an operator when an input operation performed by the operator is received,
wherein the stroke has the identification information when the stroke is drawn, and
wherein the stroke background transmittance setting interface sets the stroke background transmittance of the stroke that matches the identification information when the stroke background transmittance is set.

4. A display method comprising:
displaying in a display region an object including a content, and a stroke drawn on the content in an overlaid fashion;
setting a visibility balance of the displayed content, the setting including setting content transparency serving as transparency of the content;
setting stroke background transmittance that is transmittance of a background of the drawn stroke;
displaying an operation interface that is used to set the visibility balance; and
setting the content transparency and the stroke background transmittance by moving a slider along a straight line, wherein
the operation interface includes the slider,
a range from one point to one end point along the straight line of the slider is where the content transparency is set,
a range from the one point to another end point along the straight line of the slider is where the stroke background transmittance is set, and
the content transparency and the stroke background transmittance are set simultaneously by moving the slider along the straight line.

5. A non-transitory computer-readable recording medium storing a program causing a computer to execute a process, the process comprising:
displaying in a display region an object including a content, and a stroke drawn on the content in an overlaid fashion;
setting a visibility balance of the displayed content, the setting including setting content transparency serving as transparency of the content;
setting stroke background transmittance that is transmittance of a background of the drawn stroke;
displaying an operation interface that is used to set the visibility balance; and
setting the content transparency and the stroke background transmittance by moving a slider along a straight line, wherein
the operation interface includes the slider,
a range from one point to one end point along the straight line of the slider is where the content transparency is set, and
a range from the one point to another end point along the straight line of the slider is where the stroke background transmittance is set, and the content transparency and the stroke background transmittance are set simultaneously by moving the slider along the straight line.

\* \* \* \* \*